(12) United States Patent
Aceves

(10) Patent No.: US 7,756,102 B2
(45) Date of Patent: *Jul. 13, 2010

(54) DISTRIBUTED DETERMINATION OF DYNAMIC FRAME SIZES IN A NETWORK

(75) Inventor: J. J. Garcia Luna Aceves, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 684 days.

This patent is subject to a terminal disclaimer.

(21) Appl. No.: 11/650,197

(22) Filed: Jan. 4, 2007

(65) Prior Publication Data

US 2008/0165797 A1 Jul. 10, 2008

(51) Int. Cl.
*H04B 7/212* (2006.01)
*H04J 3/16* (2006.01)
*H04L 12/43* (2006.01)

(52) U.S. Cl. ........................ 370/348; 370/437; 370/443; 370/461

(58) Field of Classification Search ........................ None
See application file for complete search history.

(56) References Cited

U.S. PATENT DOCUMENTS

| 6,788,702 B1 | 9/2004 | Garcia-Luna-Aceves .... 370/458 |
| 6,996,074 B2 | 2/2006 | Garcia-Luna-Aceves .... 370/278 |
| 7,002,910 B2 | 2/2006 | Garcia-Luna-Aceves .... 370/229 |
| 7,046,639 B2 | 5/2006 | Garcia-Luna-Aceves .... 370/314 |
| 7,184,413 B2 | 2/2007 | Beyer .......................... 370/254 |
| 2004/0032847 A1* | 2/2004 | Cain .......................... 370/338 |
| 2007/0211686 A1* | 9/2007 | Belcea et al. ............... 370/345 |

OTHER PUBLICATIONS

Publication: L.Kleinrock and F. Tobagi, *Packet Switching in Radio Channels: Part I—Carrier Sense Multiple Access Modes and Their Throughput-Delay Characteristics*, IEEE Transactions on Communications, vol. 23, pp. 1400-1416, 1975.
Publication: R. Ramanathan, *A Unified Framework and Algorithm for Channel Assignment in Wireless Networks*, Wireless Networks, vol. 5, No. 2, pp. 81-94, 1999.
Publication: I. Chlamtac, A. Farago, and H. Zhang, *Time-Spread Multiple-Access (TSMA) Protocols for Multihop Mobile Radio Networks*, IEEE/ACM Transactions on Networking, vol. 6 No. 5, pp. 804-812, Dec. 1997.

(Continued)

*Primary Examiner*—Seema S Rao
*Assistant Examiner*—Christine Duong
(74) *Attorney, Agent, or Firm*—Park, Vaughan & Fleming LLP; Steven E. Stupp

(57) ABSTRACT

A communication system includes devices configured to communicate with each other through a temporal sequence of frames. Each of these frames includes multiple sub-channels and the total number of sub-channels in a given frame is dynamically determined based on a transmission schedule. Furthermore, the transmission schedule is calculated by the devices based on transmission lists that are exchanged between the devices. For example, a first transmission list for a first device includes a first group of sub-channels reserved by the first device, and a second group of sub-channels reserved by a set of devices communicating with the first device.

20 Claims, 20 Drawing Sheets

OTHER PUBLICATIONS

Publication: J. Ju and V. Li, *An Optimal Topology-Transparent Scheduling Method in Multihop Packet Radio Networks*, IEEE/ACM Transactions on Networking, vol. 6, No. 3, pp. 298-306, Jun. 1998.

Publication: Carlos H. Rentel, and Thomas Kunz, *On the Average-Throughput Performance of Code-Based Scheduling Protocols for Wireless Ad Hoc Networks*, Presentation at the 6th ACM International Symposium on Mobile Ad Hoc Networking and Computing, Urbana-Champaign, IL, May 2005.

Publication: I. Chlamtac, *Fair Algorithms for Maximal Link Activation in Multihop Radio Networks*, IEEE Transactions on Communications, vol. COM-35, No. 7, Jul. 1987.

Publication: A. Ephremides, T. Truong, *Scheduling Broadcasts in Multihop Radio Networks*, IEEE Transactions on Communications, vol. COM-38, No. 4, Apr. 1990.

Publication: C. D. Young, *USAP: A Unifying Dynamic Distributed Multichannel TDMA Slot Assignment Protocol*, Proc. IEEE MILCOM 96 Oct. 1996.

Publication: Z. Tang and J.J. Garcia-Luna-Aceves, *A Protocol for Topology-Dependent Transmission Scheduling*, Proc. IEEE WCNC 99, New Orleans, Louisiana, Sep. 21-24, 1999.

Publication: Z. Tang and J.J. Garcia-Luna Aceves, *Hop Reservation Multiple Access for Multichannel Packet Radio Networks*, Computer Communications, vol. 23, No. 10, Elsevier, 2000.

Publication: R. Rozovsky and P.R. Kumar, *SEEDEX: A MAC Protocol for Ad Hoc Networks*, Proc. ACM MobiHoc 2001, Oct. 4-5, 2001.

Publication: L. Bao and J. J. Garcia-Luna-Aceves, *A New Approach to Channel Access Scheduling for Ad Hoc Networks*, Proc. ACM MobiCom 2001—Seventh Annual International Conference on Mobile Computing and Networking, Jul. 16-21, 2001, Rome, Italy.

Publication: L. Bao and J. J. Garcia-Luna-Aceves, *Channel Access Scheduling in Ad Hoc Networks with Unidirectional Links*, Proc. ACM DialM 2001—Fifth International Workshop on Discrete Algorithms and Methods for Mobile Computing and Communications, Jul. 21, 2001, Rome, Italy.

Publication: L. Bao and J. J. Garcia-Luna-Aceves, *Collision-Free Topology-Dependent Channel Access Scheduling*, Proc. IEEE MILCOM 2000, Los Angeles, Calif., Oct. 22-25, 2000.

Publication: L. Bao and J.J. Garcia-Luna-Aceves, *Hybrid Channel Access Scheduling in Ad Hoc Networks*, Proc. IEEE ICNP 2002, Nov. 12-15, 2002.

Publication: L. Bao and J. J. Garcia-Luna-Aceves, *Transmission Scheduling in Ad Hoc Networks with Directional Antennas*, Proc. ACM Mobicom 2002, Sep. 23-28, 2002.

Publication: L. Bao, *MALS: Multiple Access Scheduling Based on Latin Squares*, Proc. IEEE MILCOM 2004, Monterey, CA, Oct. 31-Nov. 3, 2004.

Publication: A. Kanzaki, T. Hara and S. Nishio, *An Adaptive TDMA Slot Assignment Protocol in Ad Hoc Sensor Networks*, Proc. 2005 ACM Symposium on Applied Computing, ACM Press, pp. 1160-1165.

Publication: A. Kanzaki, T. Uemuka, T. Hara and S. Nishio, *Dynamic TDMA Slot Assignment for Ad Hoc Networks*, Proc. International Conf. on Advanced Information Networking and Applications (AINA), pp. 330-339, 2003.

\* cited by examiner

DISTRIBUTED DETERMINATION OF DYNAMIC FRAME SIZES IN A NETWORK

BACKGROUND

1. Field of the Invention

The present invention relates to techniques for accessing channels in networks. More specifically, the present invention relates to dynamic frame determination and scheduling protocols.

2. Related Art

Recent advances in networking technology have made it possible to support multiple voice-related applications, such as mobile smart phones and Voice over Wireless Internet Protocol (VoWIP) on individual networks. In the near future, these applications may be running on mobile stations concurrently with legacy data-centric applications. To support such integrated voice/data traffic in a network, the channel-access protocol in these systems needs to provide high channel utilization and bounded channel-access delay. The former is important for data-centric applications, and the latter is critical for providing uninterrupted data delivery in voice-related (i.e., real-time) applications.

Contention-based channel-access techniques have previously been developed for multiple-hop ad-hoc networks and for wireless local area networks or LANs. However, these existing techniques are unable to provide high channel utilization as network load increases. In addition, ad-hoc networks that utilize such conventional channel-access schemes are vulnerable to collisions, which can potentially starve certain stations by preventing them from acquiring the channel. As a consequence, the existing contention-based approaches are unable to ensure an upper bound on the channel-access delay. This makes it impossible to run soft real-time applications, and even bulk transfer applications, over these networks at high loads.

'Contention-free' schemes have been proposed to overcome these limitations. In doing so, these systems provide conflict-free channel access independently of the radio connectivity around any given node or device in the communication system. These contention-free schemes may be classified as 'topology independent' and 'topology dependent.' In topology-independent channel-access schemes, deterministic transmission schedules are produced that allow nodes or devices in an ad-hoc network to periodically access the communication channel without collision and also ensure a bounded channel-access delay. For example, a device may be pre-assigned one or more unique sub-channels (such as time slots) in a global schedule. However, these contention-free schemes typically require an excessive amount of control-signaling overhead and global knowledge of the network, and typically also suffer from channel under-utilization.

In contrast, topology-dependent channel-access schemes use local topology information to produce the transmission schedules. These schemes may be used to construct schedules for small groups of devices, thereby solving the under-utilization problem at high loads while only using small-area topological knowledge. For example, dynamic (randomized) channel-access schemes use probabilistic transmission schedules in which each device always has a certain probability to access the channel during a given data slot.

Unfortunately, while such techniques incur less control overhead than the earlier, contention-free channel-access protocols, they still do not ensure a bound on channel-access delay. In particular, as the number of devices competing for sub-channels increases in the communication system, the probability of any given device winning an election for a sub-channel goes down.

Hence what is needed is a method and an apparatus that facilitates channel-access in networks without the problems listed above.

SUMMARY

One embodiment of this invention provides a communication system that includes devices configured to communicate with each other through a temporal sequence of frames. Each of these frames includes multiple sub-channels and the total number of sub-channels in a given frame is dynamically determined based on a transmission schedule. Furthermore, the transmission schedule is calculated by the devices based on transmission lists that are exchanged between the devices. For example, a first transmission list for a first device includes a first group of sub-channels reserved by the first device, and a second group of sub-channels reserved by a set of devices communicating with the first device.

In some embodiments, the first device communicates with a first subset of the set of devices directly and/or with a second subset of the set of devices indirectly. Note that indirect communication between the first device and a second device may be mediated via a third device that communicates directly with the first device. Furthermore, the second group of sub-channels may include sub-channels reserved by the first subset of the set of devices and sub-channels reserved by the second subset of the set of devices.

In some embodiments, the first transmission list includes a margin for future transmission needs of either or both of the first device and the set of devices. For example, the margin may include un-reserved sub-channels for use in communicating between the devices.

In some embodiments, the first transmission list is transmitted by the first device during one or more sub-channels in the first group of sub-channels. Furthermore, the first transmission list may be exchanged during control portions of the one or more of the sub-channels in the first group of sub-channels.

In some embodiments, the first transmission list includes identifiers for the first device and the set of devices corresponding to the first group of sub-channels and the second group of sub-channels. Furthermore, the first device may be configured to determine an ordered-transmission list based on the exchanged transmission lists. This ordered-transmission list may include a lexicographical ordering of the identifiers for the sub-channels in the first transmission list. In addition, the first device may be configured to dynamically select sub-channels to reserve based on a ranking of the first device for available sub-channels in the ordered-transmission list. And in some embodiments, the first device is configured to add a sub-channel to the first transmission list if the first device is unable to select a sub-channel to reserve.

In some embodiments, the first transmission list includes updates to either or both of the first group of sub-channels and the second group of sub-channels.

In some embodiments, the transmission schedule allows conflict-free communication between the devices using the sub-channels.

In some embodiments, a time delay between two sub-channels in the first group of sub-channels is less than a pre-determined value.

In some embodiments, the total number of sub-channels is a least common multiple of the number of sub-channels in the transmission lists exchanged between the devices. Note that the least common multiple may be a product of ranks of the transmission lists divided by a largest common divisor of the ranks. For example, a first rank for the first device is a smallest power of a common base number for the communication system that is larger than a number of sub-channels in the first group of sub-channels and the second group of sub-channels.

In some embodiments, the total number of sub-channels is a common multiple of the number of sub-channels in the transmission lists exchanged between the devices.

In some embodiments, the transmission schedule repeats the first transmission list for the first device N times thereby ensuring that transmissions from the first device have the same periodicity as the transmission schedule.

In some embodiments, the sub-channels correspond to time slots, frequency bands, spread-spectrum codes, and/or directional antennas that transmit and receive the frames.

Another embodiment provides a communication device for use in the communication system.

Another embodiment provides a method including operations corresponding to the functions in the above-described communication system.

Figure 1:
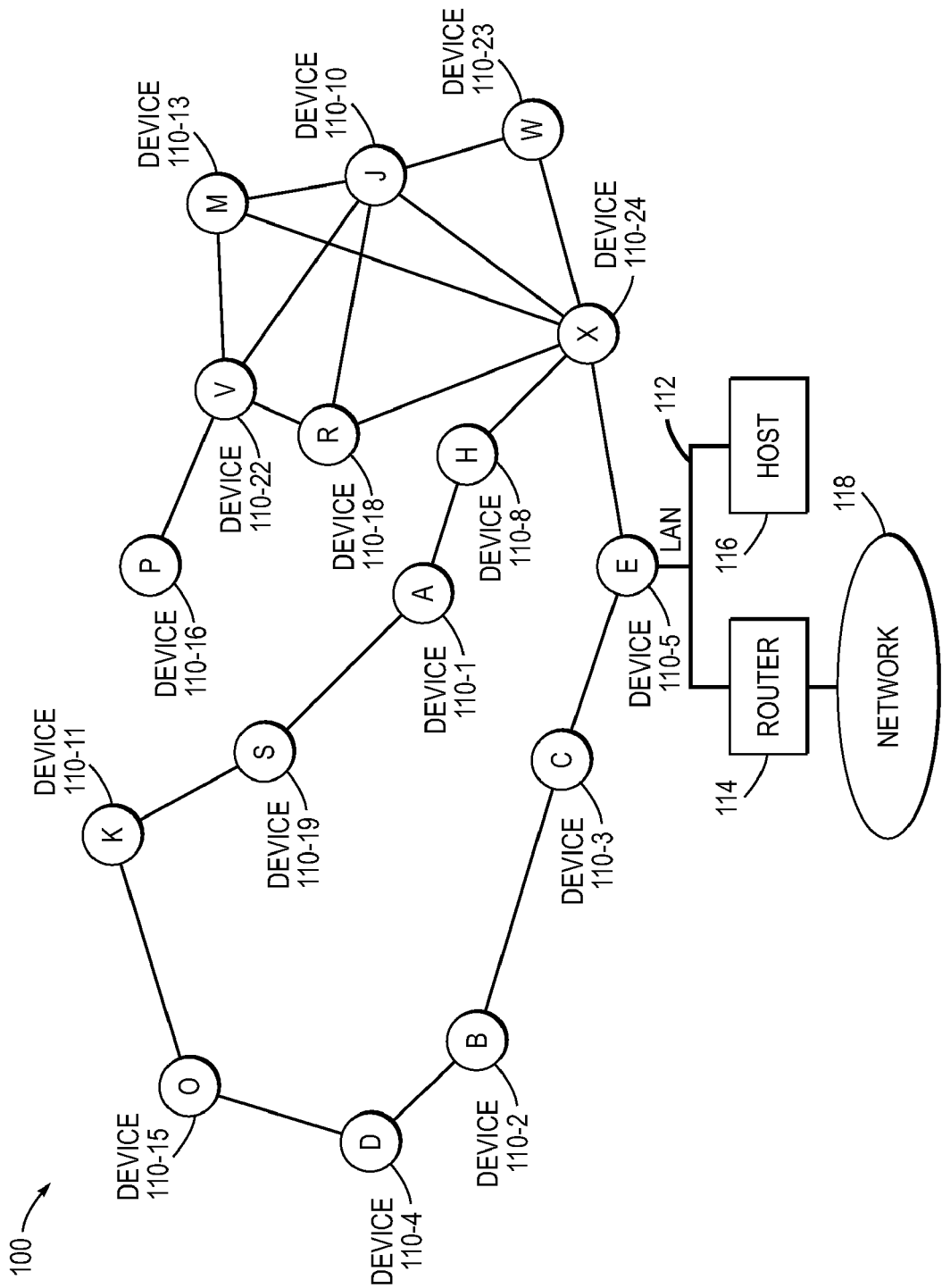
FIG. 1 is a block diagram illustrating a communication system in accordance with an embodiment of the present invention.

Table 1 provides exemplary pseudo-code for an update technique in accordance with an embodiment of the present invention.

Table 2 provides exemplary pseudo-code for a scheduling technique in accordance with an embodiment of the present invention.

Table 3 provides exemplary pseudo-code for a scheduling technique in accordance with an embodiment of the present invention.

Table 4 provides exemplary pseudo-code for a scheduling technique in accordance with an embodiment of the present invention.

Table 5 provides exemplary pseudo-code for a scheduling technique in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and devices for use with the communication system are described. Communication between the devices in the communication system may be enabled by the method. In particular, nodes or devices (henceforth referred to as devices) in the communication system may communicate by exchanging a temporal sequence of frames, each of which includes multiple sub-channels of fixed size or duration.

In the communication system, a channel-access protocol (henceforth referred to as Neighborhood Ordering for Medium Access with Determinism or NOMAD) is used to dynamically determine a transmission schedule for the shared communication channel and a total number of sub-channels in a given frame. This transmission schedule and the frame size may be calculated in a distributed manner (i.e., a decentralized manner) based on a deterministic ordering of devices that are competing for sub-channels in the communication system. Information about the competing devices may be included in transmission lists that are exchanged between devices in local neighborhoods in the communication system (such as one-hop and/or two-hop neighborhoods). Note that the transmission schedule and the dynamic frame size may allow devices to reserve sub-channels without contention and may bound channel-access delay in the communication system.

In some embodiments of NOMAD, the total number of sub-channels is a common multiple (such as a least common multiple) of the number of sub-channels in the transmission lists exchanged between the devices. Furthermore, in some embodiments the transmission schedule repeats a transmission list for a given device N times thereby ensuring that transmissions from the given device have the same periodicity as the transmission schedule. Note that N may be an integer. However, if N is not an integer then a predefined value may be used, such as the ceiling or floor of a real number.

The method, devices, and/or communication system associated with the present invention may be utilized in a wide variety of network applications, including LANs (such as WiFi, WiMax, and/or a LAN that utilizes a communication protocol that is compatible with an IEEE 802 standard), wide area networks or WANs, metropolitan area networks or MANs, and/or cellular telephone networks (such as the Global System for Mobile communication or GSM). In addition, the method and/or communication system may include fixed and/or mobile stations, nodes or devices, and the network may utilize fixed cells, may include an extended access-point network, and/or may be a random or ad-hoc network. In some embodiments, the method, devices, and/or communication system may involve or include communication protocols such as time division multiple access or TDMA, frequency division multiple access or FDMA, code division multiple access or CDMA, and/or a spatial diversity technique.

Note that in the discussion that follows the term 'election' refers to a technique for assigning sub-channels to multiple competing devices in the communication system, and the term 'reservation' refers to a technique in which a device that has won a sub-channel in an election communicates to other devices in the communication system that it intends to use the sub-channel for one, two, or more frames. Furthermore, a 'scheduling technique' may include an election technique and/or a reservation technique. Finally, a 'sub-channel' may include channel divisions, such as when a TDMA communication protocol is used.

We now discuss embodiments of NOMAD. For illustrative purposes, in this discussion the communication system has a single common communication channel and the sub-channels are time slots. Furthermore, communication between devices is bidirectional and half-duplex, i.e., a given device (represented by a device identifier NID) can only tune to one sub-channel at a time.

Note that a variety of specific device identifiers NIDs may be used in NOMAD. These NIDs may be global and unique in the communication system. For example, NIDs may correspond to Medium-Access-Control (MAC) addresses or transmitter-assigned local identifiers, which may be mapped to the globally unique identifier of a given device using additional control information that is exchanged among the devices. In an exemplary embodiment, the NID of device N is the concatenation of a sequence number selected by device N followed by its MAC address or another unique identifier for the device. However, in another exemplary embodiment of NOMAD, the NID of a device is the concatenation of a sequence of symbols that are used to represent information, such as priorities, data flows traversing the device, and/or a number of time slots assigned to a given device in a given neighborhood, followed by an identifier that uniquely identifies the device throughout the network or communication system. Furthermore, a string of zeros or a string of ones may indicate that there is no valid device identifier, and an empty value for a device identifier may include a sequence of zeros denoted by the symbols "Ø" or "_." Therefore, for any valid device identifier K, K is greater than Ø. For convenience, in the discussion that follows the device identifier of each device is indicated by the letter inside the device.

FIG. 1 presents a block diagram illustrating a communication system 100 (such as an ad-hoc network) in accordance with an embodiment of the present invention. In this system, devices 110 in direct radio connectivity with a given device (such as device 110-3) are called the one-hop neighbors of device 110-3. For example, the one-hop neighbors of device 110-3 are devices 110-2 and 110-5. Note that a set of devices including a given device and its one-hop neighbors is called the one-hop neighborhood of the device. Furthermore, one-hop neighbors of the one-hop neighbors of the given device are called the two-hop neighbors of that device, and the set of devices including the one-hop neighborhood of the given device and its two-hop neighbors is called the two-hop neighborhood of the given device. Therefore, in the communication system 100, devices 110-2 and 110-5 are one-hop neighbors of device 110-3, and devices 110-2, 110-3, and 110-5 form the one-hop neighborhood of device 110-3. In addition, devices 110-4 and 110-24 are two-hop neighbors of devices 110-3, and devices 110-2, 110-3, 110-4, 110-5, and 110-24 are the two-hop neighborhood of device 110-3.

In the communication system 100, a device executing NOMAD may be coupled to end hosts or routers that may access the Internet through a direct link or a network. For example, device 110-3 is coupled to host 116 and router 114 through local area network 112, and is coupled to network 118 through router 114.

During communication between the devices 110 in the communication system 100, information is stored and exchanged. In particular, each device transmits a neighborhood update to its one-hop neighbors. In an exemplary embodiment, each time slot in NOMAD may include a control portion and a data portion, and the neighborhood update may be included in the control portion. For example, each data packet transmitted by the given device during a given time slot, or the first packet transmitted by the given device during the given time slot, may include a header that specifies the neighborhood-update information used in NOMAD. In another embodiment, the given time slot is divided into a control mini-time slot and a data mini-time slot. In this example, the given device assigned to the given time slot may transmit its neighborhood update message during the control mini-time slot, and may transmit one or more data packets during the data mini-time slot. And in another embodiment, a device transmits an update message followed by one or more data packets during the given time slot assigned to the given device.

In NOMAD, the neighborhood update from device K ($NU_K$) specifies the identifier of device K, the time-slot number of the current time slot according to the neighborhood-transmission schedule of device K, a reported-transmission list ($RTL_K$), and/or an error protection field. Note that the $RTL_K$ transmitted by device K is derived from an ordered-transmission list computed by device K. Furthermore, the ordered-transmission list of device K includes time-slot positions (i.e., ranks) that are assigned to device K, to each of its one-hop neighbors, and/or to zero or more of its two-hop neighbors. In some embodiments, the reported-transmission list of device K also specifies incremental updates to the time-slot positions in the ordered-transmission list of device K or its one-hop neighbors. Note that in the following discussion, a given device transmits reported-transmission lists specifying all the time-slot positions assigned to the devices in the one-hop neighborhood of the given device.

Reported-transmission list may be represented in a number of ways. In some embodiments, $RTL_K$ includes a list of device identifiers ordered by rank, with each entry corresponding to the device identifier of a one-hop neighbor of device K or an empty value for the entry. Furthermore, the number of entries in $RTL_K$ equals the number of time-slot positions in the ordered-transmission list of device K, and an entry in $RTL_K$ is either a device identifier or the empty value Ø.

However, in another embodiment $RTL_K$ includes of a list of tuples ordered by rank (i.e., time-slot position) in the ordered-transmission list of device K, and includes device K and each of its known one-hop neighbors. Each tuple in $RTL_K$ may specify a rank value and a device identifier. Note that the last tuple in $RTL_K$ with rank L may specify a device identifier equal to Ø, and L may be larger than the rank value of the previous tuple with a non-empty device-identifier value. This entry may be included in $RTL_K$ to indicate that the ordered-transmission list used by device K is of rank L, i.e., it includes L time-slot positions. Furthermore, consecutive tuples in $RTL_K$ need not specify consecutive rank values. A missing rank value may indicate that device K and none of its one-hop neighbors are assigned the time slot with that rank in the ordered-transmission list used by device K. In the following discussion, embodiments with reported-transmission lists that include tuples are used as an illustration.

Device K may also maintain a neighbor-list table ($NLT_K$) that includes the reported-transmission lists communicated by each of its one-hop neighbors and the reported-transmission list that device K communicates to its one-hop neighbors. As noted previously, these reported-transmission lists may be organized by rank (i.e., time-slot positions). Furthermore, the reported-transmission list from one-hop-neighbor device N stored by device K in $NLT_K$, which is denoted by $RTL_{KN}$, includes r_max tuples, where r_max is the largest rank value of any tuple in the reported-transmission list $RTL_N$ last sent by device N. In addition, the entry in $RTL_{KN}$ corresponding to time-slot position r is a tuple including a rank value equal to r and a device-identifier value that is either Ø or equals the device identifier reported by device N for rank r. For example, an entry at rank p in $RTL_{KN}$ is equal to Ø if $RTL_N$ did not contain an entry at rank p, and p is smaller than or equal to r_max.

In addition, device K may maintain its ordered-transmission list ($OTL_K$) specifying the time-slot positions assigned for the transmissions by devices in its two-hop neighborhood. Note that the reported-transmission list corresponding to device K and stored in $NLT_K$ is denoted by $RTL_{KK}$. $RTL_{KK}$ includes the content of $OTL_K$ with the device identifiers of the time-slot positions assigned to two-hop neighbors set to Ø.

Note that in some embodiments communication system 100 includes fewer or additional components, two or more components are combined into a single component, and/or a position of one or more components may be changed. For example, while the preceding discussion has used one-hop and two-hop neighborhoods as an illustration, in other embodiments the lists may include additional hops. For example, in some embodiments the transmission lists may include three or more hops.

Figure 2:
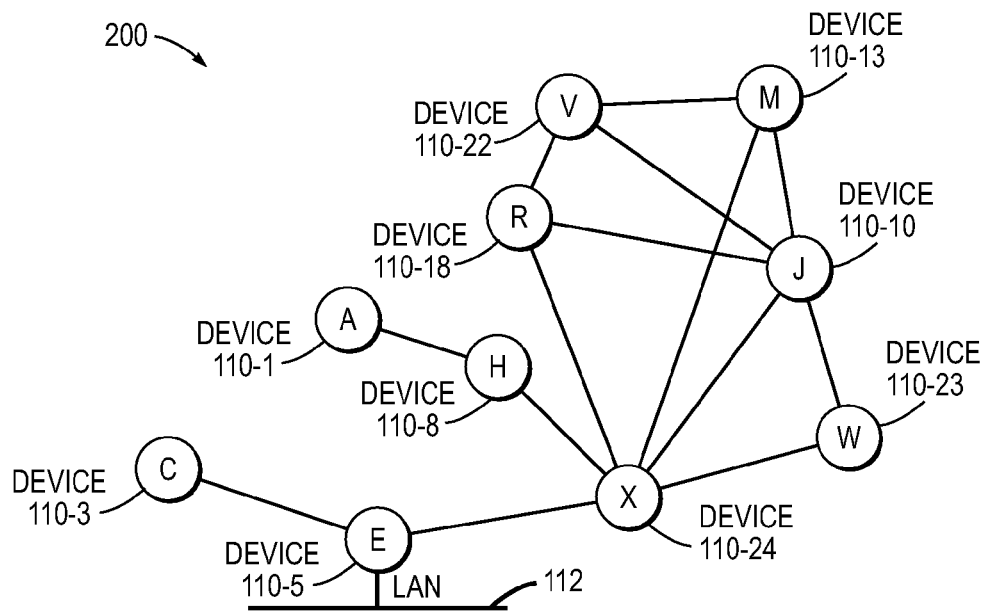
FIG. 2 is a block diagram illustrating a two-hop neighborhood in a communication system in accordance with an embodiment of the present invention.

FIG. 2 presents a block diagram illustrating a two-hop neighborhood 200 of device 110-24 in the communication system 100 (FIG. 1) in accordance with an embodiment of the present invention. Note that the one-hop and two-hop neighbors of device 110-24 are the only devices in communication system 100 (FIG. 1) that are relevant for the computation of the ordered-transmission list at device 110-24.

Figure 3:
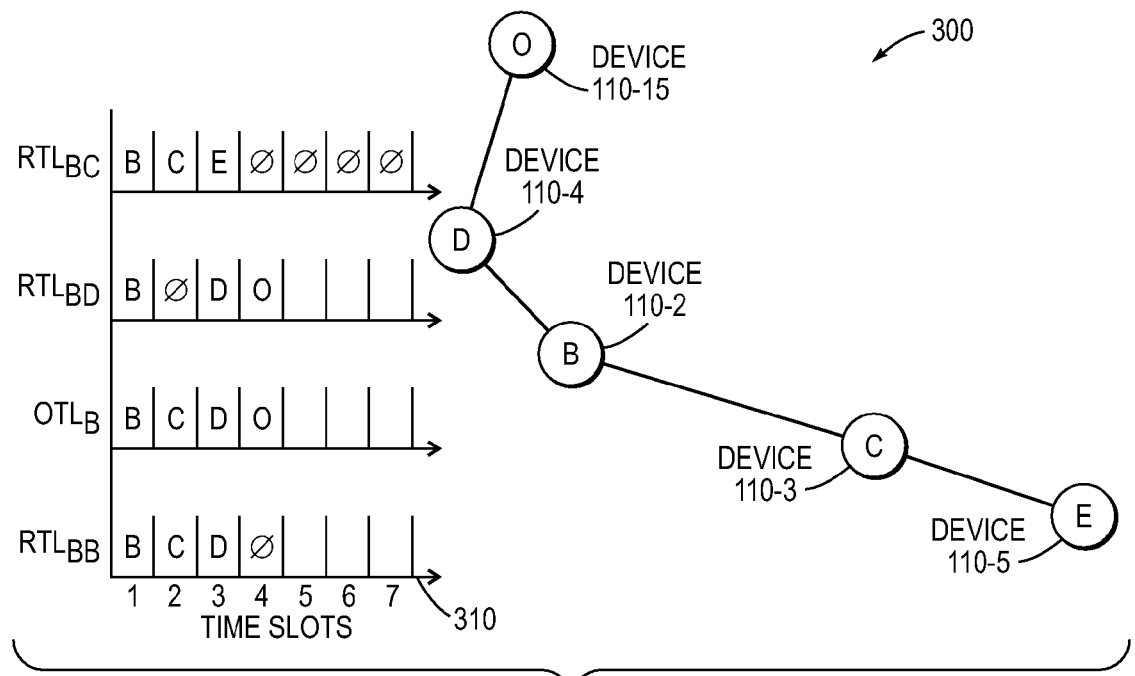
FIG. 3 is a block diagram illustrating a two-hop neighborhood in a communication system in accordance with an embodiment of the present invention.

FIG. 3 presents a block diagram illustrating required or reserved time slots 310 in a two-hop neighborhood 300 of device 110-2 in the communication system 100 (FIG. 1) in accordance with an embodiment of the present invention. In the discussion that follows, device 110-2 has identifier 'B' or is referred to as device B. FIG. 3 also illustrates an exemplary embodiment of the reported-transmission lists and ordered-transmission list that are maintained by device B. Furthermore, note that we use the notation "X>Y" to indicate that the value denoted by "X" is larger than the value denoted by "Y" according to a lexicographic order chosen in the embodiments of NOMAD. For example, examples of a lexicographic order are "2>3," "BBB>BB," and "CCC>CAC." However, in some embodiments lexicographic ordering is defined as "2<3," "BBB<BB," and "CCC<CAC." Also note that the concatenation of symbol "B" following symbol "A" is denoted by "A⊕B."

Figure 4:
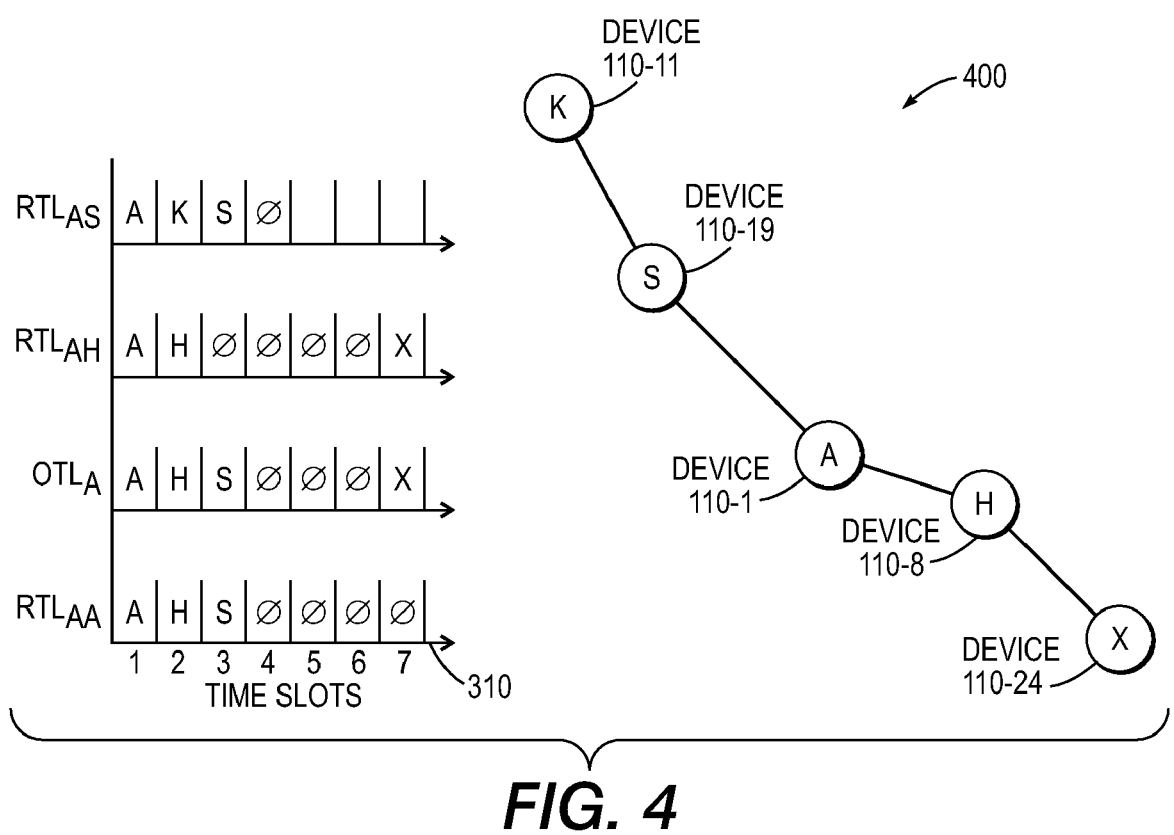
FIG. 4 is a block diagram illustrating a two-hop neighborhood in a communication system in accordance with an embodiment of the present invention.
Figure 5:
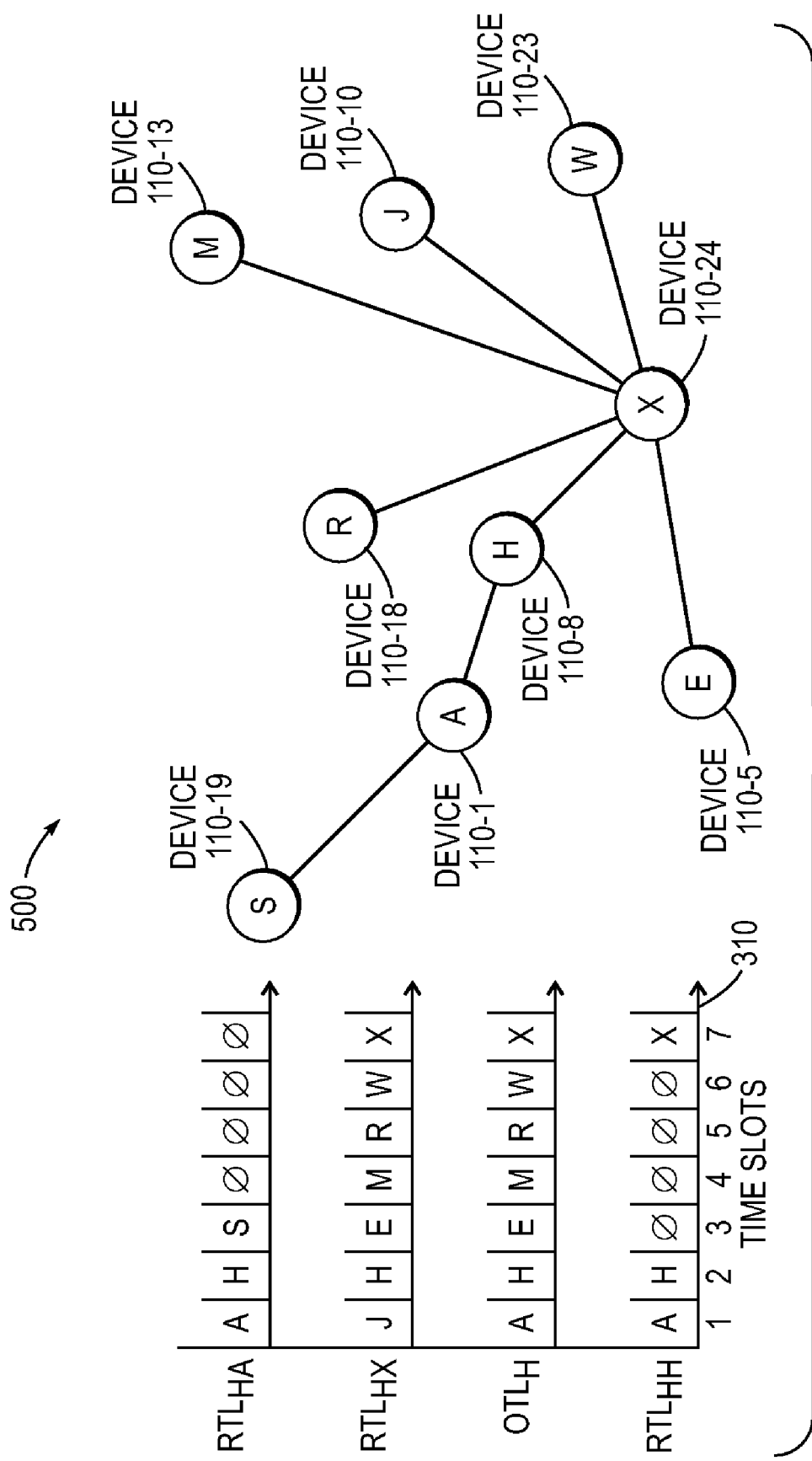
FIG. 5 is a block diagram illustrating a two-hop neighborhood in a communication system in accordance with an embodiment of the present invention.

Device B is aware of its two-hop neighborhood from the ordered-transmission lists communicated by its one-hop neighbors. FIGS. 4 and 5 present block diagram illustrating two-hop neighborhood 400 for device 110-1 (device 'A') and two-hop neighborhood 500 for device 110-8 (device 'H') in the communication system 100 (FIG. 1) in accordance with an embodiment of the present invention. FIGS. 4 and 5 also illustrate an exemplary embodiments of the reported-transmission lists and ordered-transmission list that are maintained by devices A and H.

In the two-hop neighborhood 300 (FIG. 3), we note that the device identifiers of the one-hop neighbors of device B are devices 110-3 (device 'C') and 110-4 (device 'D'). In this example, the ordered-transmission list of device B $OTL_B$ is [(1, B) (2, C) (3, D) (4, O)], and the reported-transmission list $RTL_{BB}$ stored in device B and communicated to its one-hop neighbors is [(1, B) (2, C) (3, D) (4, Ø)]. Note that the ordered-transmission list for device B includes four time slots to allow its two-hop-neighbor device 110-15 (device 'O') to transmit without conflicts. Therefore, $RTL_B$ includes an empty device identifier for the tuple at rank 4.

In the two-hop neighborhood 400 (FIG. 4), we note that device A has device 110-19 (device 'S') and device H as its one-hop neighbors, and that $OTL_A$ is [(1, A) (2, H) (3, S) (4, Ø) (5, Ø) (6, Ø) (7, X)]. Furthermore, the reported-transmission list that device A sends to its neighbors is $RTL_{AA}$ and equals [(1, A) (2, H) (3, S) (7, Ø)]. Note that device A includes the last tuple with a rank of 7 and an empty device identifier in $RTL_A$ to indicate that its ordered-transmission list has two-hop neighbors using time slots up to rank 7.

In the two-hop neighborhood 500 (FIG. 5), we note that device H has device A and device 110-24 (device 'X') as its one-hop neighbors, and that $OTL_H$ is [(1, A) (2, H) (3, E) (4, M) (5, R) (6, W) (7, X)]. Furthermore, the reported-transmission list that device H sends to its neighbors is $RTL_{HH}$ and is [(1, A) (2, H) (7, X)]. Note that entries left unspecified in $RTL_{HH}$ are interpreted by the neighbors of device H as indicating time-slot positions with empty device identifiers, i.e., that neither device H nor any of its one-hop neighbors are using time slots at those positions.

As two-hop neighborhoods 300 (FIG. 3), 400 (FIG. 4), and 500 illustrate, there are two cases in which devices 110 may send reported-transmission lists with empty time-slot positions. For example, one reason for an empty time-slot position in $RTL_{AA}$ is that neither device A nor any of its one-hop neighbors occupies that time-slot position, but at least one of its two-hop neighbors occupies the time-slot position. In some embodiments, because transmissions are broadcast from a given device to all of its one-hop neighbors over a single channel, device A must not use such a time-slot position to prevent interference with some of its two-hop neighbors. Another reason for an empty time-slot position at rank r in $RTL_{AA}$ is that no device in the two-hop neighborhood of device A occupies the time-slot position with rank r, but at least one of its one-hop neighbors has a schedule with a time-slot position occupied by device A or one of its one-hop neighbors at a rank greater than r. This aspect of NOMAD is illustrated in the two-hop neighborhood 400 (FIG. 4), where device A leaves time slot with rank 7 empty, because its two-hop-neighbor device X occupies that time-slot position according to the ordered-transmission list sent by one-hop-neighbor device H. Also note that device A assigns an empty device identifier for time slots with ranks 4, 5 and 6 to include the time-slot positions needed by device X.

Figure 6:
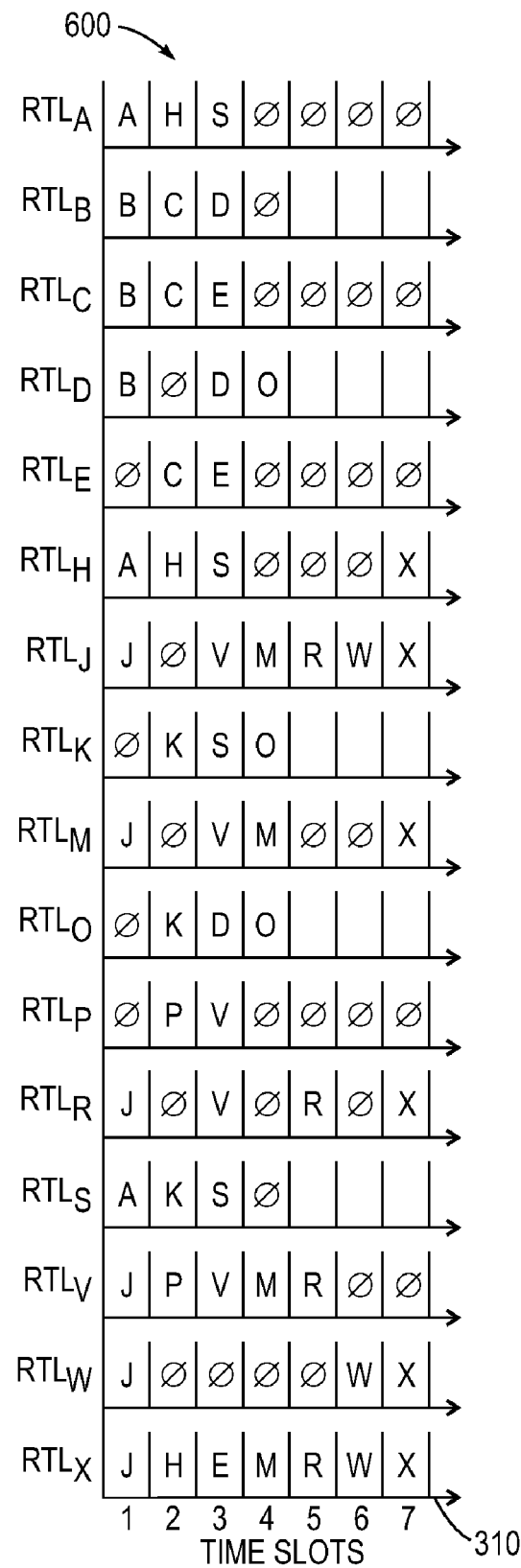
FIG. 6 is a block diagram illustrating transmission lists that are reported by devices in a communication system in accordance with an embodiment of the present invention.
Figure 7:
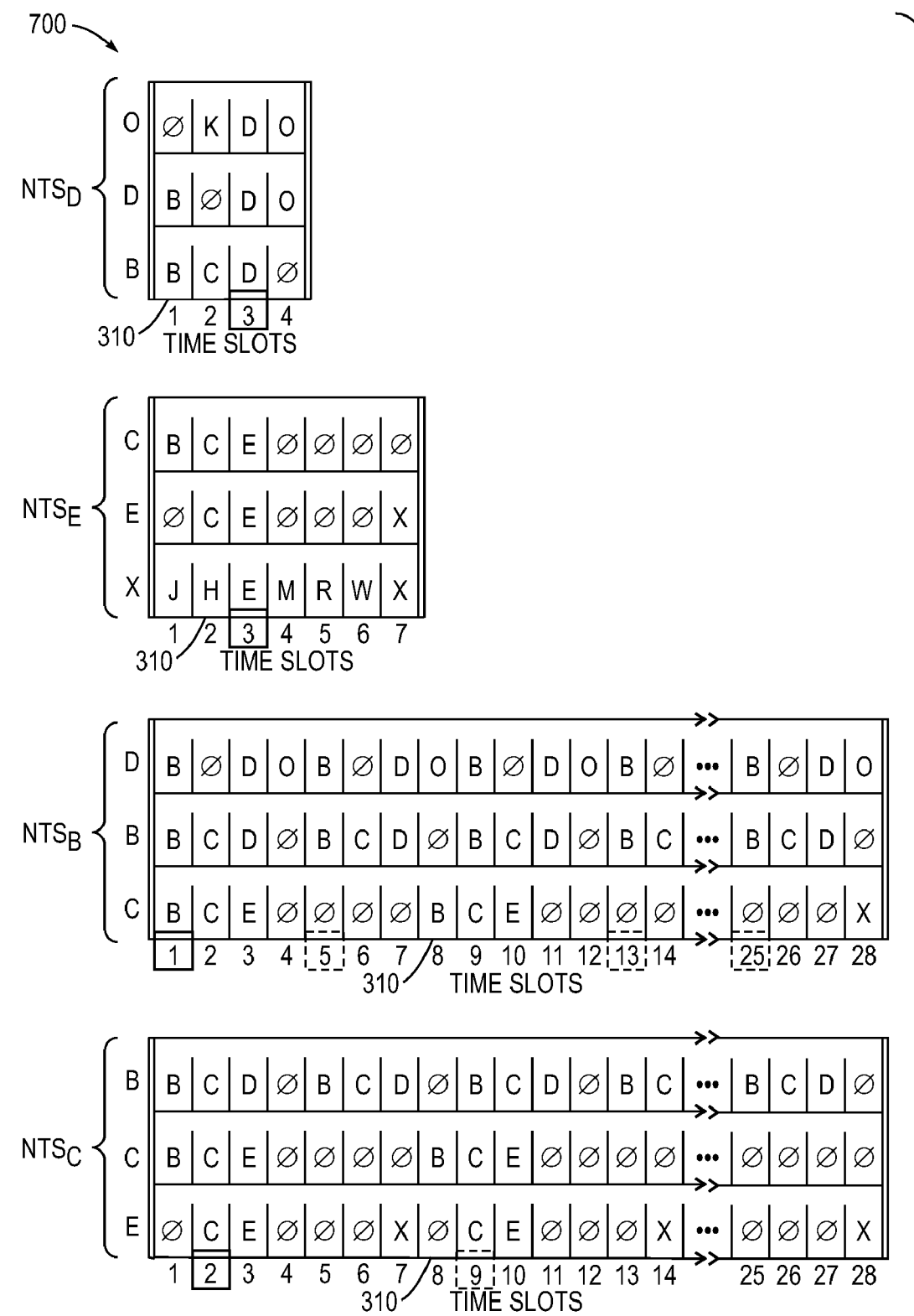
FIG. 7 is a block diagram illustrating neighborhood-transmission schedules computed by devices in a communication system in accordance with an embodiment of the present invention.
Figure 8:
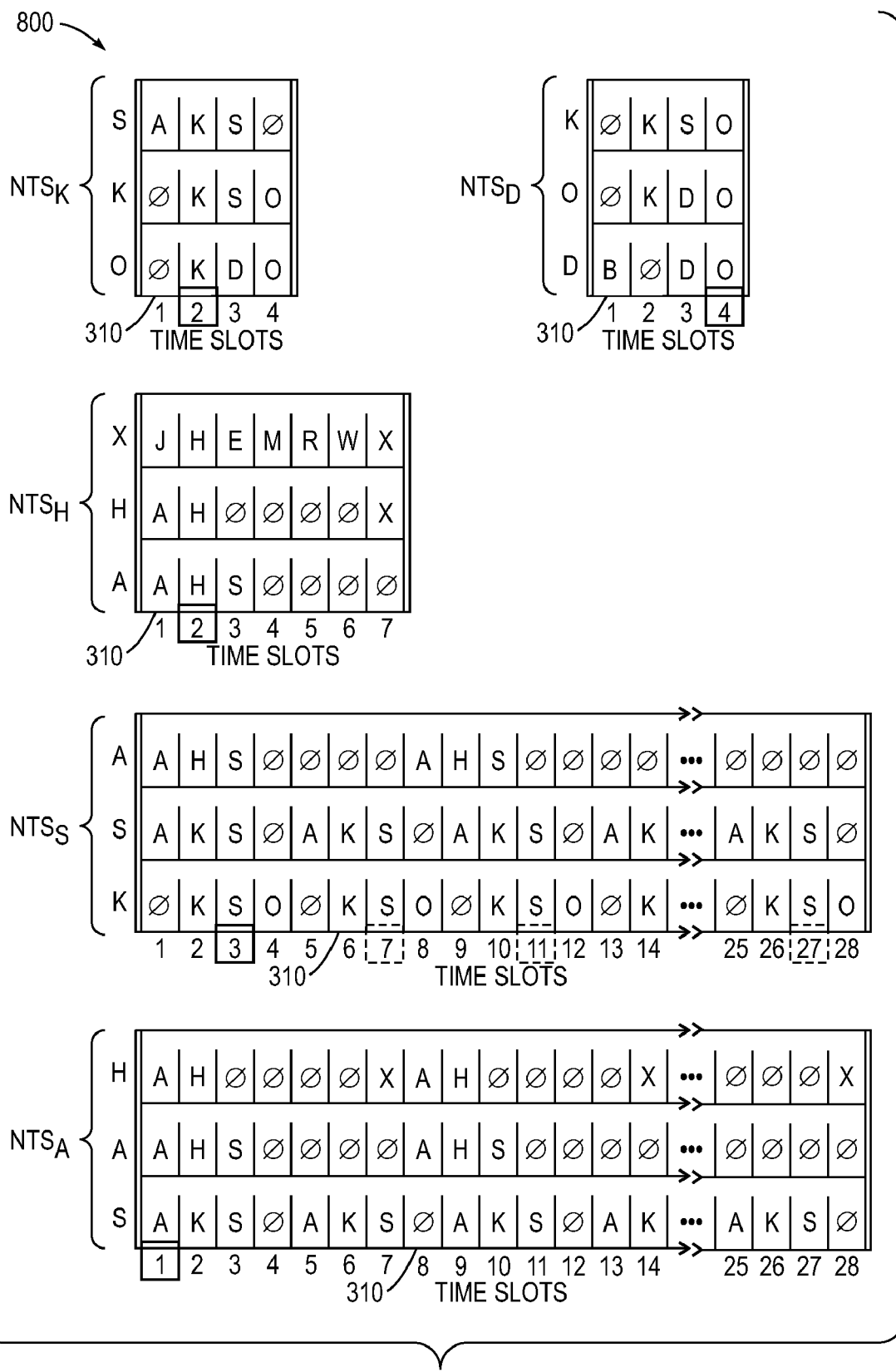
FIG. 8 is a block diagram illustrating neighborhood-transmission schedules computed by devices in a communication system in accordance with an embodiment of the present invention.

FIG. 6 presents a block diagram illustrating reported-transmission lists 600 that are reported by each device in the communication system 100 (FIG. 1) in accordance with an embodiment of the present invention. As discussed further below, note that FIGS. 3-6 illustrate the use of Least Common Multiple Scheduling (LCMS) to compute neighborhood-transmission schedules. Note that the transmission lists are presented in lexicographic order of device identifiers, and that the schedule ranks for devices 110 (FIG. 1) are either 4 or 7 time-slot positions.

As noted previously, device K maintains neighborhood-transmission-schedule table ($NTS_K$), which is an ordered list of tuples that each correspond to a time slot in the transmission schedule. Each tuple in $NTS_K$ includes a vector of entries lexicographically ordered according to the device identifier of the devices in the one-hop neighborhood of device K. $NTS_K$ may be viewed as having a row for each device in the one-hop neighborhood of device K, and each column as corresponding to a time-slot position in the transmission schedule. Note that the number of time slots (i.e., the rank) in the neighborhood-transmission schedule equals the number of slots required for device K to cycle through all the reported-transmission lists in its one-hop neighborhood in a way that device K is able to start each cycle of its neighborhood-transmission schedule with the first time-slot position of each reported-transmission list.

FIGS. 7-9B are block diagrams illustrating neighborhood-transmission schedules 700, 800, and 900 computed by devices in the communication system 100 (FIG. 1) in accordance with an embodiment of the present invention. As discussed further below, a specific scheduling discipline, LCMS, is used in these exemplary embodiments. In LCMS, the rank (i.e., the number of time slots) of the neighborhood-transmission schedule computed by a given device in the communication system 100 (FIG. 1) includes the minimum number of time slots for each device in the two-hop neighborhood of the given device that has been assigned at least one time slot by all the devices in the one-hop neighborhood of the given device. Note that the ranks of neighborhood-transmission schedules may vary across the communication system 100 (FIG. 1).

We now describe embodiments of transmission scheduling in NOMAD. As discussed previously, in NOMAD a given device may access the common channel of a network (such as an ad-hoc network) following a neighborhood-transmission schedule computed from the reported-transmission lists exchanged in its one-hop neighborhood. During initialization, the given device (device K) may listen to the common channel for an initialization time period $ITP_K$ (which may correspond to several time slots) to acquire time synchronization with device K's one-hop neighbors, and to receive neighborhood updates from these one-hop neighbors. While device K listens to the channel for $ITP_K$ seconds, it may update $NLT_K$, $OTL_K$ and $NTS_K$ according to the update techniques described below, and based on the information communicated in neighborhood updates received from device K's one-hop neighbors. If device K does not receive any neighborhood update during $ITP_K$, device K may select the current time slot for itself. In this case, the transmission list includes only one time slot.

During subsequent communication, device K stores the reported-transmission lists. For example, after receiving reported-transmission list $RTL_N$ from one-hop neighbor N or after detecting the loss of radio connectivity with one-hop neighbor N, device K updates $RTL_{KN}$ in $NLT_K$. Define NID_N[r] as the device identifier of the tuple at rank r in $RTL_N$, define NID_KN[r] as the device identifier of the tuple at rank r in $RTL_{KN}$, and define r_max as the maximum rank included in $RTL_N$. Furthermore, assume that a non-existing entry of $RTL_N$ has an empty device identifier. Then in some embodiments, when updating $RTL_{KN}$ device K sets NID_KN[r]=Ø and NID_KN[r]=NID_K[r] for all K in the set {1, . . . , r_max}.

Two-hop neighborhood 300 (FIG. 3) illustrates an exemplary embodiment of how reported-transmission lists are stored. In particular, the reported-transmission lists sent by devices C and D to device B are $RTL_C$=[(1, B) (2, C) (3, E) (7, Ø)] and $RTL_D$=[(1, B) (3, D) (4, Ø)]. Based on this information, device B stores $RTL_{BC}$=[(1, B) (2, C) (3, E) (4, Ø) (5, Ø) (6, Ø) (7, Ø)] and $RTL_{BD}$=[(1, B) (2, Ø) (3, D) (4, O)].

Note that in some embodiments, after device K determines that its one-hop-neighbor device N is lost, it sets the device identifiers in each tuple of $RTL_{KN}$ to Ø to indicate that device K is not two hops away from several other devices via device N. Furthermore, in some embodiments the reported-transmission lists include empty time-slot positions to make the computation of neighborhood-transmission schedules more efficient. An example of this is discussed below for Common Base Multiple Scheduling.

We now discuss embodiments of the computation of ordered-transmission lists and reported-transmission lists. Each time device K updates $NLT_K$, it updates $OTL_K$. If a reported-transmission list or loss of a neighbor relates to one-hop neighbor N, device K may update $OTL_K$ in two phases after it updates $RTL_{KN}$ in $NLT_K$. During the first phase, device K may select time-slot positions assigned to one-hop or two-hop neighbors in $OTL_K$ and time-slot positions with an empty device identifier to accommodate the length of the transmission lists of its one-hop neighbors. Furthermore, during the second phase device K may select a time-slot position for itself. Note that the operations used to update an ordered-transmission list take into account that inconsistencies may occur in the information about the two-hop neighborhood of a given device due to device mobility, device failures, and other causes.

Table 1 provides exemplary pseudo-code for an update technique in accordance with an embodiment of the present invention. This update technique is used to give priority to one-hop neighbors over two-hop neighbors, and to give priority to neighbors with larger device identifiers according to the lexicographic order used in NOMAD. Note that NID_KN[r] is defined as the device identifier of the tuple at rank r in $RTL_{KN}$, and NID_K[r] is defined as the device identifier of the tuple at rank r in $OTL_K$. Furthermore, we assume that a non-existing entry in $RTL_K$ has an empty device identifier.

TABLE 1

If NID_K[r] = X in $OTL_K$ and NID_KN[r] = Y in $RTL_{KN}$;
  If X = Ø;
    NID_K[r] = y;
If X and Y are one-hop neighbors of device K;
  If Y > X;
    NID_K[r] = Y;
If X and Y are two-hop neighbors of device K;
  If Y > X;
    NID_K[r] = Y;
If X is a one-hop neighbor of device K and Y is a two-hop neighbors of device K;
  NID_K[r] = X;
If X is a two-hop neighbor of K and Y is a one-hop neighbor of device K;
  NID_K[r] = Y;

After device K updates $OTL_K$, it may select for itself the time-slot position with the smallest rank that does not have a device identifier larger than K. If no time-slot position can be assigned to device K from the existing time-slot positions, device K may add a time-slot position for itself at the end of $OTL_K$. As illustrated for two-hop neighborhood 300 (FIG. 3), device B determines $OTL_B$=[(1, B) (2, C) (3, D) (4, O)] from $RTL_{BC}$=[(1, B) (2, C) (3, E) (4, Ø) (5, Ø) (6, Ø) (7, Ø)] and $RTL_{BD}$=[(1, B) (2, C) (3, D) (4, O)] before it selects time-slot position 1 for itself. Note that the length of $OTL_B$ is four time slots after this operation because no one-hop neighbor of device B reports an ordered-transmission list with a tuple that has a non-empty device-identifier value at a rank larger than 4. Similarly for two-hop neighborhood 500 (FIG. 5), device H determines $OTL_H$=[(1, A) (2, H) (3, E) (4, M) (5, R) (6, W) (7, X)] from $RTL_{HA}$=[(1, A) (2, H) (3, S) (4, Ø) (5, Ø) (6, Ø) (7, Ø)] and $RTL_{HX}$=[(1, J) (2, H) (3, E) (4, M) (5, R) (6, W) (7, X)] before it determines a time-slot position for itself.

Then, after device K computes $OTL_K$, it updates its reported-transmission list $RTL_{KK}$ by first copying $OTL_K$ into $RTL_{KK}$ and then setting to empty the device identifiers of two-hop neighbors. Device K also prepares the reported-transmission list to be sent to its neighbors, which is denoted by $RTL_K$. This list includes tuples corresponding to time-slot positions occupied by device K and device K's one-hop neighbors. $RTL_K$ may also include an end tuple with an empty device-identifier value to notify one-hop neighbors about the length of $RTL_K$.

For two-hop neighborhood 300 (FIG. 3), device B computes $RTL_{BB}$=[(1, B) (2, C) (3, D) (4, Ø)] from $OTL_B$=[(1, B) (2, C) (3, D) (4, O)] by setting to empty the device identifier of device O in FIG. 1, which is a two-hop neighbor. Then, device B reports to its neighbors the list $RTL_B$=[(1, B) (2, C) (3, D) (4, Ø)].

Furthermore, for two-hop neighborhood 400 (FIG. 4), device A determines $RTL_{AA}$=[(1, A) (2, H) (3, S) (4, Ø) (5, Ø) (6, Ø) (7, Ø)] from $OTL_A$=[(1, A) (2, H) (3, S) (4, Ø) (5, Ø) (6, Ø) (7, X)] by setting to empty the device identifier corresponding to device X, which is a two-hop neighbor. Device A reports to its neighbors the list $RTL_A$=[(1, A) (2, H) (3, S) (7, Ø)].

In some embodiments, device K may find a new one-hop neighbor or new two-hop neighbor with the reception of a reported-transmission list from that device. Device K accounts for such new entries when updating $NLT_K$ and $OTL_K$. Furthermore, in some embodiments device K determines loss of connectivity with a one-hop neighbor when it fails to receive a number of reported-transmission lists from that neighbor. If device K determines that its one-hop-neighbor device N is lost, it may reset all the device identifiers in the tuples of $RTL_{KN}$ to empty and updates $OTL_K$. Note that when device K loses connectivity with a one-hop neighbor N, device K may be able to obtain a more efficient ordered-transmission list given that there may be fewer competitors for the shared channel in the two-hop neighborhood of device K. However, changing an existing transmission schedule very quickly may be counterproductive because it takes time for the new two-hop neighborhood information to propagate through the communication system.

We now discuss embodiments of the computation of a neighborhood-transmission schedule by a device from the reported-transmission lists in the device's one-hop neighborhood. Note that the neighborhood-transmission schedule of device K, $NTS_K$, may include a row for each device in its one-hop neighborhood and a column for each time slot required in the schedule. Also note that the approach used to build a neighborhood-transmission schedule from reported-transmission lists is called the scheduling technique.

In some embodiments, the scheduling technique used in NOMAD includes ordering the device identifiers in the reported-transmission lists stored at a device according to the time-slot positions they occupy, and then copying the sequence of device identifiers contained in the reported-transmission lists one or more times into the neighborhood-transmission schedule. For example, the number of times that the reported-transmission list of a device in the one-hop neighborhood is copied into the neighborhood-transmission schedule is selected so the neighborhood-transmission schedule starts with the first time-slot position of all the reported-transmission lists in the one-hop neighborhood and ends at the last time slot prior to the time slot where all of the reported-transmission lists repeat. Therefore, in some embodiments the neighborhood-transmission schedule repeats one or more of the transmission lists for the devices N times (where N may be an integer) thereby ensuring that transmissions from the devices have the same periodicity as the neighborhood-transmission schedule.

Based on the information in its neighborhood-transmission schedule, device K may select those time slots in $NTS_K$ for which its one-hop neighbors have no conflict with a transmission from device K. For example, based on the device identifiers listed for each time-slot position in the neighborhood-transmission schedule, device K may select a time slot for itself when its device identifier is listed in that time slot for each row of the neighborhood-transmission schedule. Furthermore, device K may also select for itself a time slot for which the device identifiers follow some lexicographic order that favors device K.

Note that in this scheduling technique devices that are within two hops of one another must agree on the time slot where each of their neighborhood-transmission schedules starts. Device K may determine the start of the transmission schedule of a one-hop neighbor each time it receives a reported-transmission list from that neighbor. For example, to reduce discrepancies on the mapping of the current time to the corresponding time slot in the neighborhood-transmission schedule, a device may select a schedule anchor to determine the position of the current time slot relative to the neighborhood-transmission schedule it computes.

We now discuss embodiments of a scheduling technique that uses Least Common Multiple Scheduling (LCMS). In LCMS, the number of time slots in the neighborhood-transmission schedule of device K equals the least common multiple (LCM) of the ranks of the reported neighbor lists in the one-hop neighborhood of device K. A variety of approaches may be used to compute the LCM of the rank of the reported-transmission lists in a one-hop neighborhood. One approach uses the Euclidean technique, in which the product of the ranks of reported-transmission lists is computed and then this product is divided by the greatest common divisor of the ranks of the same reported-transmission lists. Thus, in the LCMS technique the reported-transmission list of one-hop neighbor N of device K may be repeated a number of times equal to the LCM of the ranks of the reported-transmission lists divided by the rank of the reported-transmission list from device N.

Table 2 provides exemplary pseudo-code for a scheduling technique that uses LCMS to build $NTS_K$ in accordance with an embodiment of the present invention. $Rank[RTL_{KN}]$ is defined as the rank (i.e., the number of time-slot positions) of $RTL_{KN}$, and $NID[RTL_{KN}]$ is defined as the ordered list of device identifiers included in the row of $NLT_K$ that stores the device identifiers reported in $RTL_{KN}$. Furthermore, $NTS_K[N]$ is defined as the row of $NTS_K$ corresponding to one-hop-neighbor device N, and $OHN_K$ is defined as the set of devices in the one-hop neighborhood of device K. Note that the number of time slots in $NTS_K$ equals $LCM_K$, and each time-slot position in the reported-transmission list of one-hop neighbor N of device K is repeated a number of times equal to $cycle_{KN}$.

TABLE 2

$LCM(NTS_K)$

Note: compute the least common multiple ($LCM_K$) of the ranks of the reported-transmission lists in
$NLT_K$;
for each N in $OHN_K$;
    $NTS_K[N] = \emptyset$;
    count = 0;
    Compute $cycle_{KN} = LCM_K / rank[RTL_{KN}]$;
    While (count < $cycle_{KN}$);
        $NTS_K[N] = NTS_K[N] \oplus NID[RTL_{KN}]$;
        count = count +1;
end;

In some embodiments, device K selects as its schedule anchor a device in its one-hop neighborhood with the reported-transmission list that has the largest rank and the largest device identifier if there are ties in the largest rank of reported-transmission lists. For example, in two-hop neighborhood 300 (FIG. 3), device B selects device C as its schedule anchor because its list rank is 7, which is larger than the list ranks of devices B and D. Similarly, in two-hop neighborhood 400 (FIG. 4), device A selects device H as its schedule anchor because its list rank is 7 (which is equal to the list rank of device A and is larger than the list rank of 4 reported by device 110-19 or device 'S') and because S is larger than A lexicographically. And in two-hop neighborhood 500 (FIG. 5), all the devices in the one-hop neighborhood of device H have the same list rank. Therefore, device H chooses device X as its schedule anchor because it has the largest device identifier.

Neighborhood-transmission schedules for the communication system 100 (FIG. 1) are illustrated in FIGS. 7-9B. In neighborhood-transmission schedules 700 (FIG. 7), all the reported-transmission lists stored at device D have the same rank equal to 4, and therefore the device identifiers of each reported-transmission list is cycled only once because $LCM_D$ equals 4 and $cycle_{DN}$ equals 1 for each of the devices N in the one-hop neighborhood of device D. In contrast, the reported-transmission lists stored at device B have different ranks. In particular, $rank[RTL_{BD}]$ equals 4, $rank[RTL_{BB}]$ equals 7, and $rank[RTL_{BC}]$ equals 7. Therefore, $LCM_B$ equals 28, $cycle_{BD}$ equals 7, $cycle_{BB}$ equals 4, and $cycle_{BC}$ equals 4. Note that the list of device identifiers in $RTL_{BD}$ is repeated seven times in sequence, while the list of device identifiers in $RTL_{BB}$ and $RTL_{BC}$ are repeated only four times.

In neighborhood-transmission schedules 700 (FIG. 7), 800 (FIG. 8), and 900 (FIGS. 9A and 9B), devices in one-hop neighborhoods with devices reporting reported-transmission lists that have ranks that are not multiples of each other end up with neighborhood-transmission schedules with much larger ranks. These ranks are determined by the LCM of the ranks of the reported-transmission lists in the one-hop neighborhoods of the devices. For example, devices A, B, and C have neighborhood-transmission schedules with 28 time slots, while device D and device 110-11 (device 'K') have neighborhood-transmission schedules with four time slots, and the rest of the devices have neighborhood-transmission schedules that include seven time slots.

Table 3 provides exemplary pseudo-code for a scheduling technique that device K uses to select time slots for its transmissions in accordance with an embodiment of the present invention. Note that $NTS_K[N, t]$ is the device identifier in $NTS_K[N]$ for time-slot t.

TABLE 3

Figure 9A:
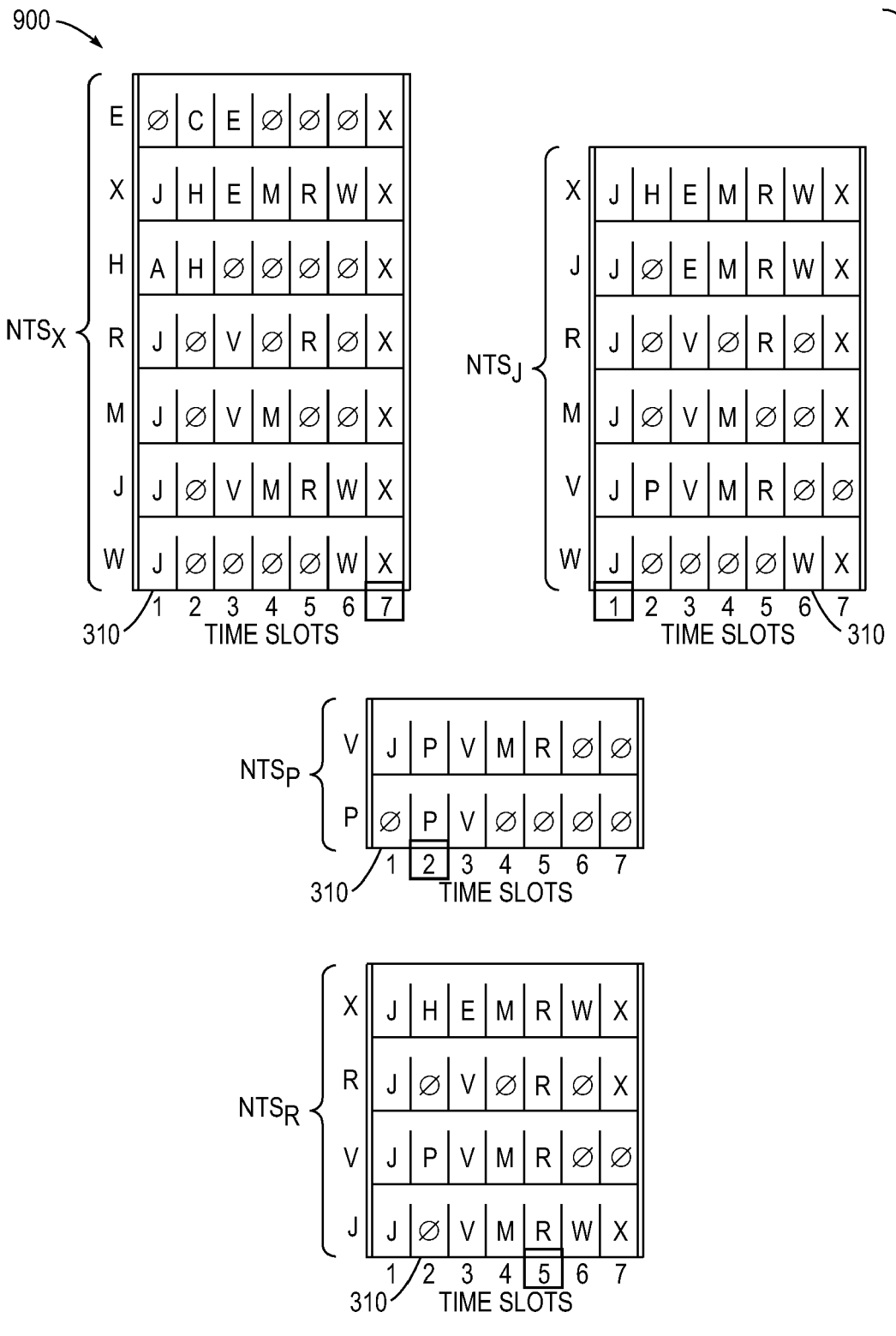
FIG. 9A is a block diagram illustrating neighborhood-transmission schedules computed by devices in a communication system in accordance with an embodiment of the present invention.
Figure 9B:
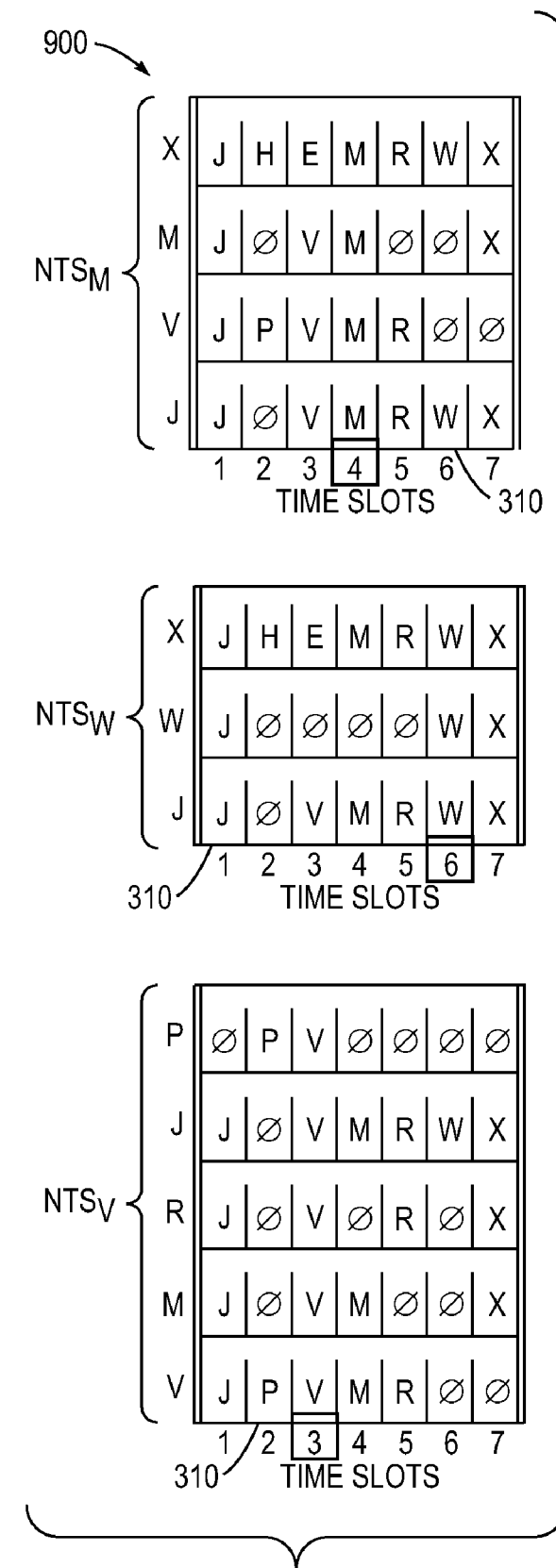
FIG. 9B is a block diagram illustrating neighborhood-transmission schedules computed by devices in a communication system in accordance with an embodiment of the present invention.

LCM(time-slot selection)

for t = 1 to $LCM_K$;
    Note: select t if case is true;
    Unanimous selection of device K;
        $NTS_K[N, t] = K$ for all N in $OHN_K$;
    Partial selection of device K;
        $NTS_K[K, t] = K$;
        ($NTS_K[N, t] = \emptyset$ and $K \geqq N$) or ($NTS_K[N, t] = K$) for each N in $OHN_K$;
        $NTS_K[P, t] = P$ for $K > P$ for each $N \neq P$ or K in $OHN_K$;
        $NTS_K[N, t] = K$ or P or $\emptyset$ for each $N \neq P$ or K in $OHN_K$;
        $NTS_K[P, t] = K$ and $NTS_K[N, t] = K$ or P or $\emptyset$ for each $N \neq P$ or K in $OHN_K$;
end;

Time slots that each device selects for transmission are highlighted in the neighborhood-transmission schedules 700 (FIG. 7), 800 (FIG. 8), and 900 (FIGS. 9A and 9B). Note that when LCMS is used in NOMAD, each device is guaranteed to have at least one time slot in each cycle of its neighborhood-transmission schedule because all devices follow the same ordering operations when constructing their neighborhood-transmission schedules, and because each device in the two-hop neighborhood of device K must have a time slot allocated for device K. In the scheduling technique illustrated in Table 3, device K may obtain additional time slots in its neighborhood-transmission schedule. Therefore, NOMAD with LCMS guarantees a minimum transmission rate of $1/LCM_K$ to device K. However, the number of time slots that device K can claim beyond one time slot for each $LCM_K$ time slots depends on the device identifiers in its one-hop neighborhood and how their reported-transmission lists overlap to form its transmission schedule. Thus, in some embodiments it is desirable to obtain neighborhood-transmission schedules with smaller ranks (i.e., a smaller number of time slots).

A guaranteed time slot for each device is indicated with a solid square in neighborhood-transmission schedules 700 (FIG. 7), 800 (FIG. 8), and 900 (FIGS. 9A and 9B). This guaranteed time slot ensures that a maximum time delay between two sub-channels for each device is less than a pre-determined value. Furthermore, the additional time slots that a device can use in its neighborhood-transmission schedule are indicated by empty dashed squares. Note that devices with one-hop neighbors having reported-transmission lists of the same rank have neighborhood-transmission schedules of that rank because the LCM equals the rank of the reported-transmission lists. In these examples, the devices only have one transmission opportunity in its neighborhood-transmission schedule because only the first case for time-slot selection outlined above is true. Examples of this are device D, device 110-5 (device 'E'), device H, device K, device 110-10 (device 'J'), device 110-13 (device 'M'), device 110-16 (device 'P'), device 110-18 (device 'R'), device 110-22 (device 'V'), device 110-23 (device 'W'), and device X.

As illustrated in neighborhood-transmission schedules 800 (FIG. 8), the neighborhood-transmission schedule of a device with one-hop neighbors with reported-transmission lists of different ranks may give the device a single time slot for transmission, which corresponds to the one time slot for which all devices in the one-hop neighborhood select that device for transmission. This is the case for device A. In contrast, device S obtains five additional time slots for transmission from the 28 time slots of its neighborhood-transmission schedule for a total transmission rate of 6 out of 28 time slots.

In addition, note that the reason why device A has a low transmission rate compared to other devices in the communication system 100 (FIG. 1) is that its LCM is large, its reported-transmission list is long compared to the reported-transmission lists of other devices in its one-hop neighborhood, and its device identifier is small compared to other devices in its one-hop neighborhood.

We now describe embodiments of scheduling techniques that uses common products. In some embodiments, NOMAD uses a scheduling technique that is referred to as Common Product Scheduling (CPS). Scheduling in CPS is similar to scheduling in LCMS. One difference is that the rank of the neighborhood-transmission schedule of a device in CPS equals the product of the ranks of the reported-transmission lists in its one-hop neighborhood as opposed to the LCM of those ranks as in LCMS. Note that the common product may be easier to compute that a least common multiple. However, the rank of the resulting neighborhood-transmission schedule may be much longer with CPS.

In some embodiments, NOMAD uses a scheduling technique that is referred to as Common Base Multiple Scheduling (CBMS). Scheduling in CBMS is also similar to scheduling in LCMS. One difference is the number of time slots that each device uses to represent its reported-transmission list. In CBMS, the rank of $RTL_K$ is the smallest power of a base number that is pre-defined for the communication system. For example, this base number may be large enough to accommodate the number of time-slot positions needed for device K to allow its one-hop and two-hop neighbors to transmit. Furthermore, note that the use of powers of a common base in CBMS may make the number of time slots of any neighborhood-transmission schedule equal to the rank of the longest reported-transmission list in the one-hop neighborhood of the device computing the neighborhood-transmission schedule.

Figure 10:
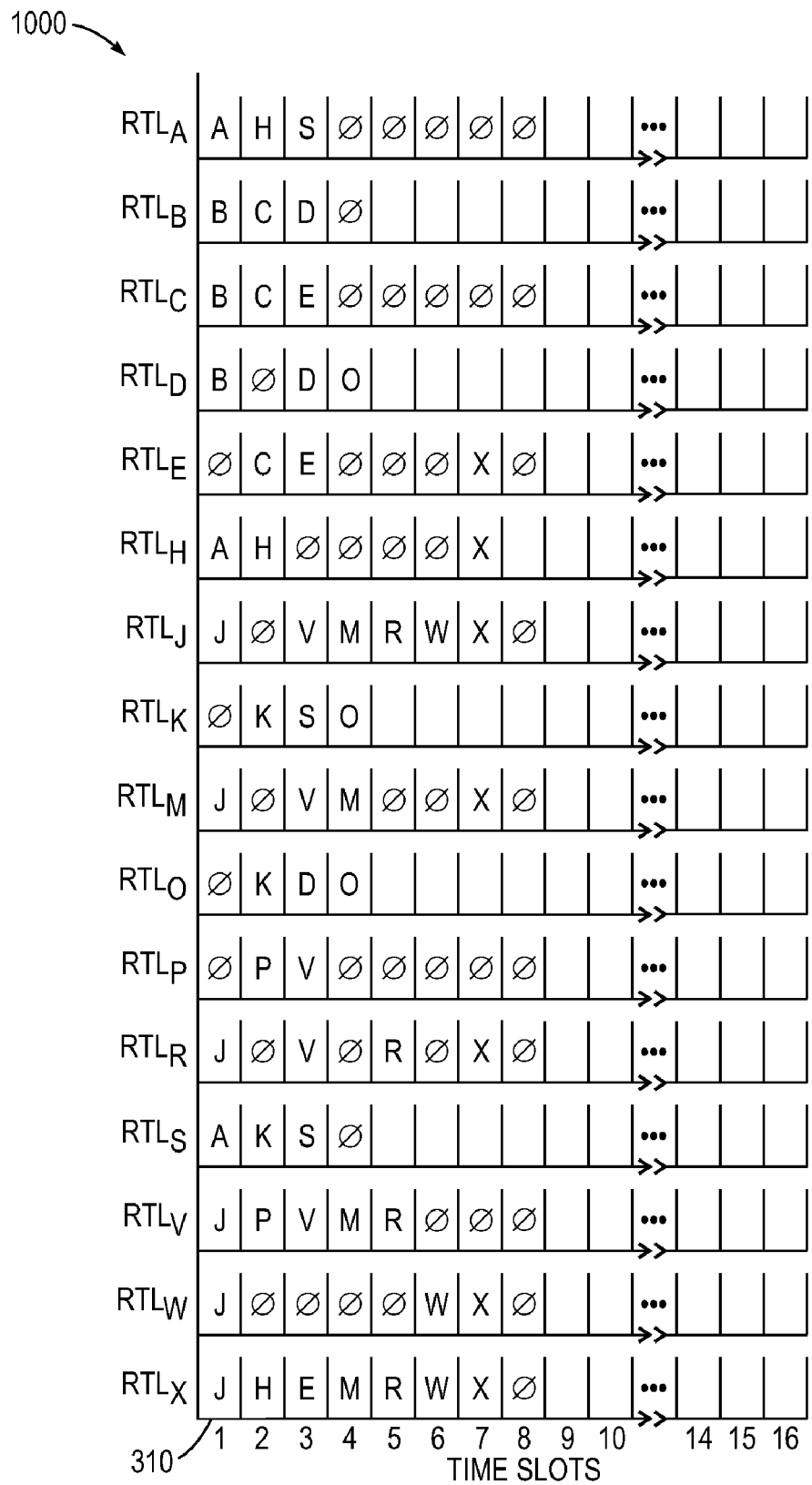
FIG. 10 is a block diagram illustrating transmission lists reported by devices in a communication system in accordance with an embodiment of the present invention.

FIG. 10 presents a block diagram illustrating reported-transmission lists 1000 reported by devices 110 (FIG. 1) in the communication system 100 (FIG. 1) using CBMS in accordance with an embodiment of the present invention. In this example, a common base equal to 2 is used, which indicates that the ranks of the reported-transmission lists may be 2, 4, 8, 16, or another power of two. Compared to the reported-transmission lists 600 (FIG. 6) obtained using LCMS, it is clear that the only impact on the reported-transmission lists in CBMS is that several of them have a rank of 8 instead of 7, with the last time-slot position having an empty device identifier.

Figure 11:
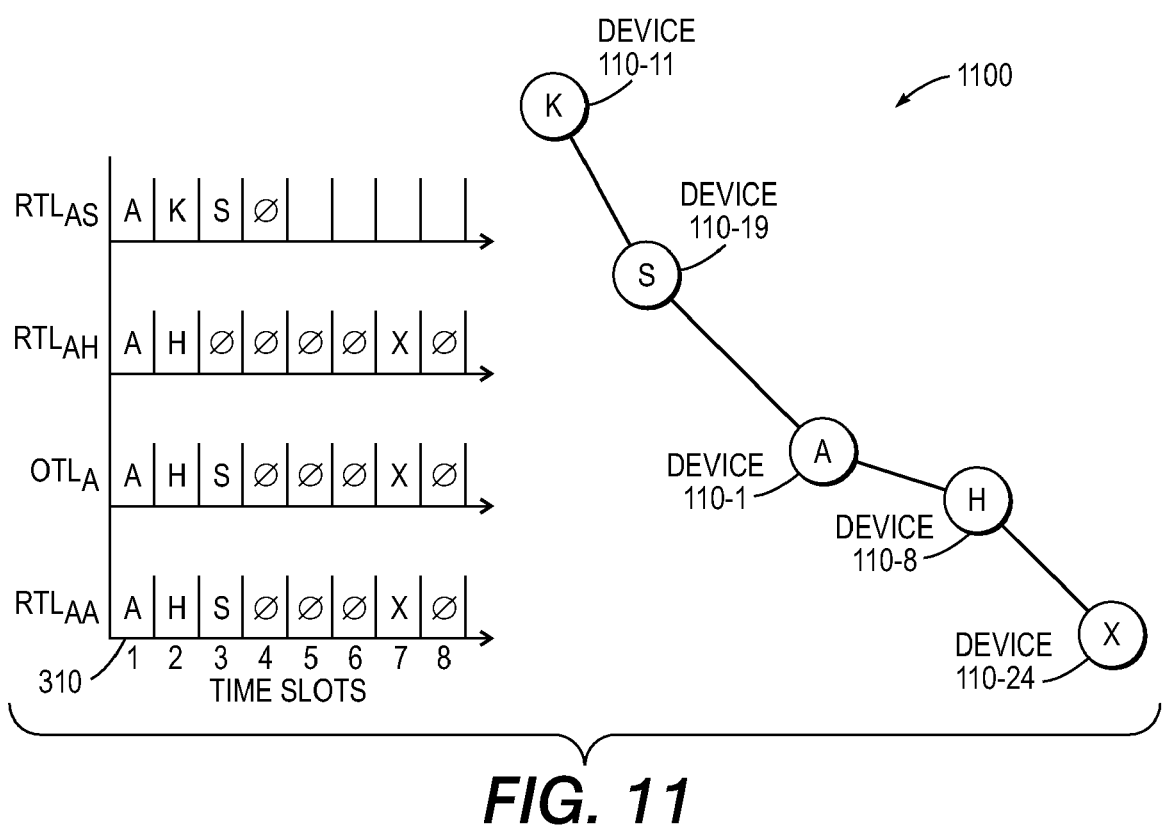
FIG. 11 is a block diagram illustrating a two-hop neighborhood in a communication system in accordance with an embodiment of the present invention.

FIG. 11 presents a block diagram illustrating a two-hop neighborhood 1100 in a communication system in accordance with an embodiment of the present invention. Also illustrated are the reported-transmission lists and the ordered-transmission list maintained at device A when CBMS is used in NOMAD. In particular, device A determines that $OTL_A$= [(1, A) (2, H) (3, S) (4, Ø) (5, Ø) (6, Ø) (7, X) (8, Ø)] and $RTL_{AA}$=[(1, A) (2, H) (3, S) (4, Ø) (5, Ø) (6, Ø) (7, Ø) (8, Ø)] from $RTL_{AS}$=[(1, A) (2, K) (3, S) (4, Ø)] and $RTL_{AH}$=[(1, A) (2, H) (3, Ø) (4, Ø) (5, Ø) (6, Ø) (7, X) (8, Ø)]. Note that the last position in the reported-transmission list of device A is used to ensure that the rank of the list is a power of 2, which is the common base used in this example. Furthermore, note that device A transmits the list $RTL_A$=[(1, A) (2, H) (3, Ø) (7, X) (8, Ø)] to its one-hop neighbors, which implies that positions 4, 5, and 6 in its reported-transmission list have empty device identifiers.

Table 4 provides exemplary pseudo-code for a CBMS scheduling technique in accordance with an embodiment of the present invention. Note that the selection of time slots for transmission in this technique is slightly different than with LCMS because there may be a number of time slots in a neighborhood-transmission schedule for which all devices in a one-hop neighborhood assign an empty device identifier as a result of making the ranks of reported-transmission lists multiples of a common base. Therefore, an operation may be used to select devices from the one-hop neighborhood to transmit in time slots for which all devices in the one-hop neighborhood have an empty device-identifier value.

TABLE 4

$CBM(NTS_K)$

Note: compute the common base multiple ($CBM_K$) from the ranks of the reported-transmission lists
in $NLT_K$;
for each N in $OHN_K$;
   $NTS_K[N]$ = Ø;
   count = 0;
   Compute $cycle_{KN}$ = $CBM_K$/rank[$RTL_{KN}$];
   While (count < $cycle_{KN}$);
     $NTS_K[N]$ = $NTS_K[N]$ ⊕ $NID[RTL_{KN}]$;
     count = count +1;
end;

Note that different operations may be used to make these assignments in the context of CBMS. In some embodiments of NOMAD, device K selects time slot t in its neighborhood-transmission schedule only if $NTS_K[N, t]$ equals K for each device N in the one-hop neighborhood of device K. In this example, one or multiple time slots may go unassigned to specific devices and are used to enable devices to enter the neighborhood-transmission schedule by sending neighborhood updates over such time slots on a best-effort basis.

However, some embodiments use the technique illustrated in Table 5, which provides exemplary pseudo-code for a CBMS scheduling technique in accordance with an embodiment of the present invention. This technique selects time slots for transmission in a neighborhood-transmission schedule. Note that time slots are initially assigned empty device-identifier values for devices in the one-hop neighborhood in a sequence that is based on the lexicographic ordering of the device identifiers.

TABLE 5

Figure 12A:
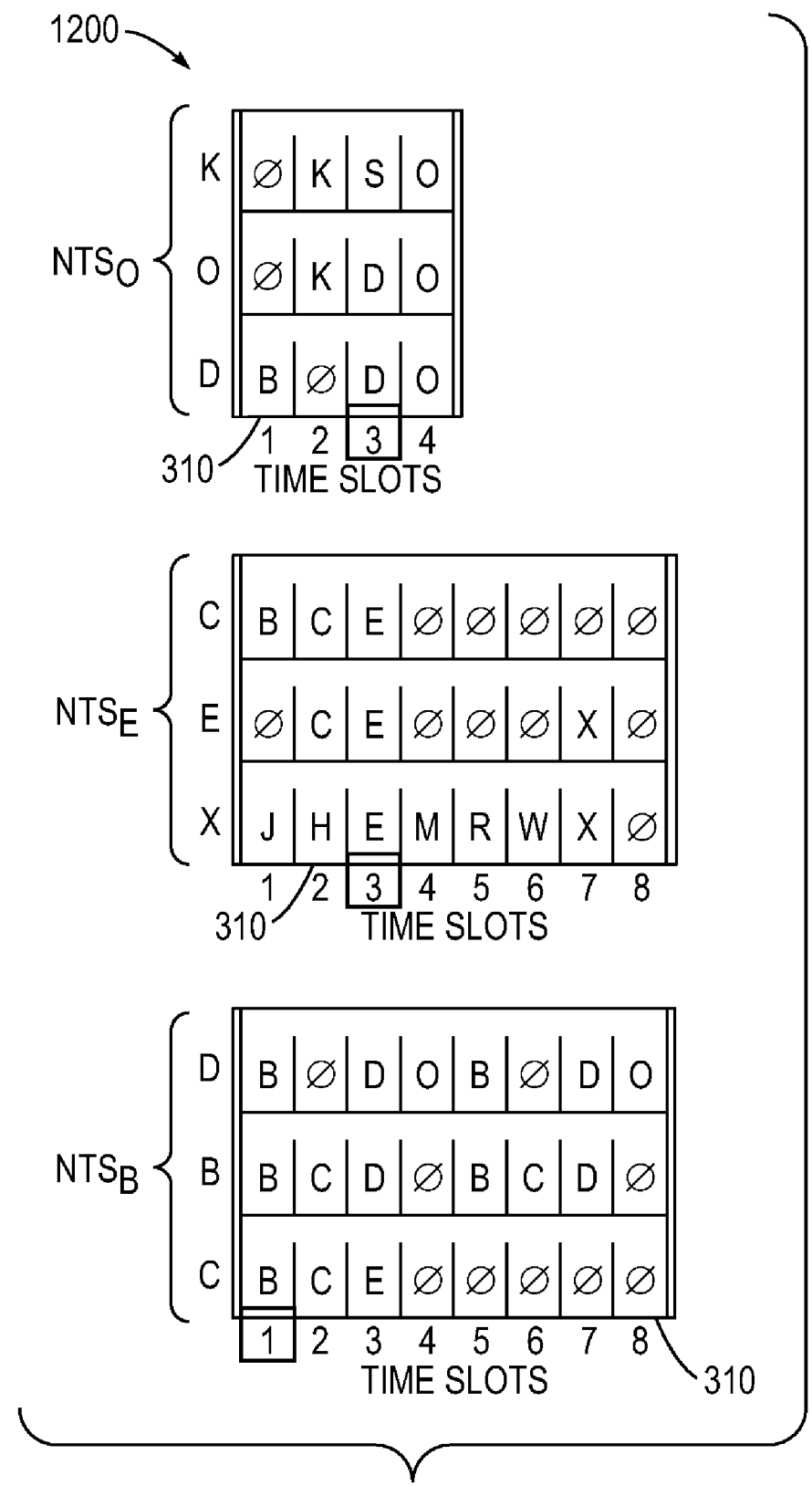
FIG. 12A is a block diagram illustrating neighborhood-transmission schedules computed by devices in a communication system in accordance with an embodiment of the present invention.
Figure 12B:
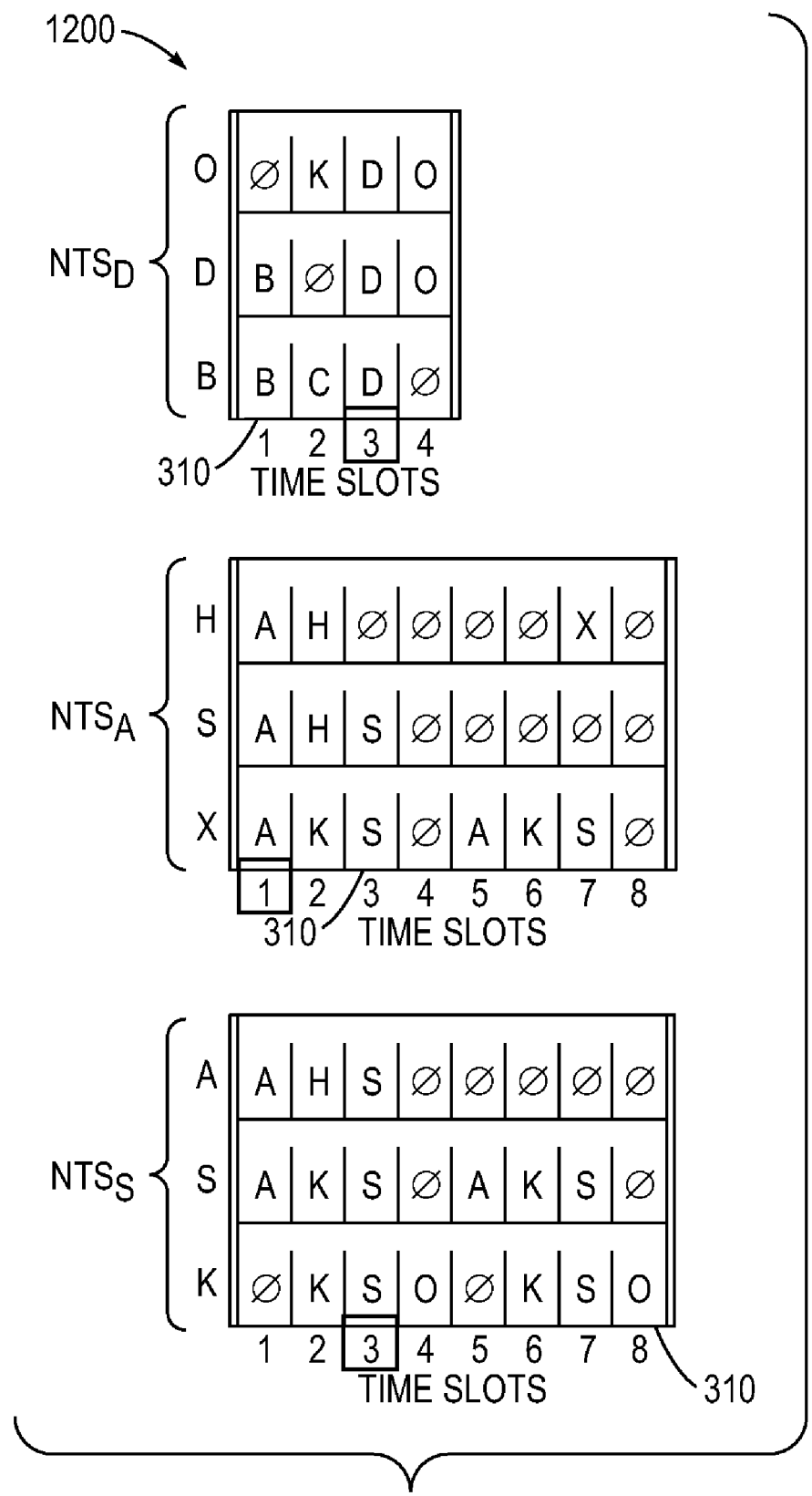
FIG. 12B is a block diagram illustrating neighborhood-transmission schedules computed by devices in a communication system in accordance with an embodiment of the present invention.
Figure 12C:
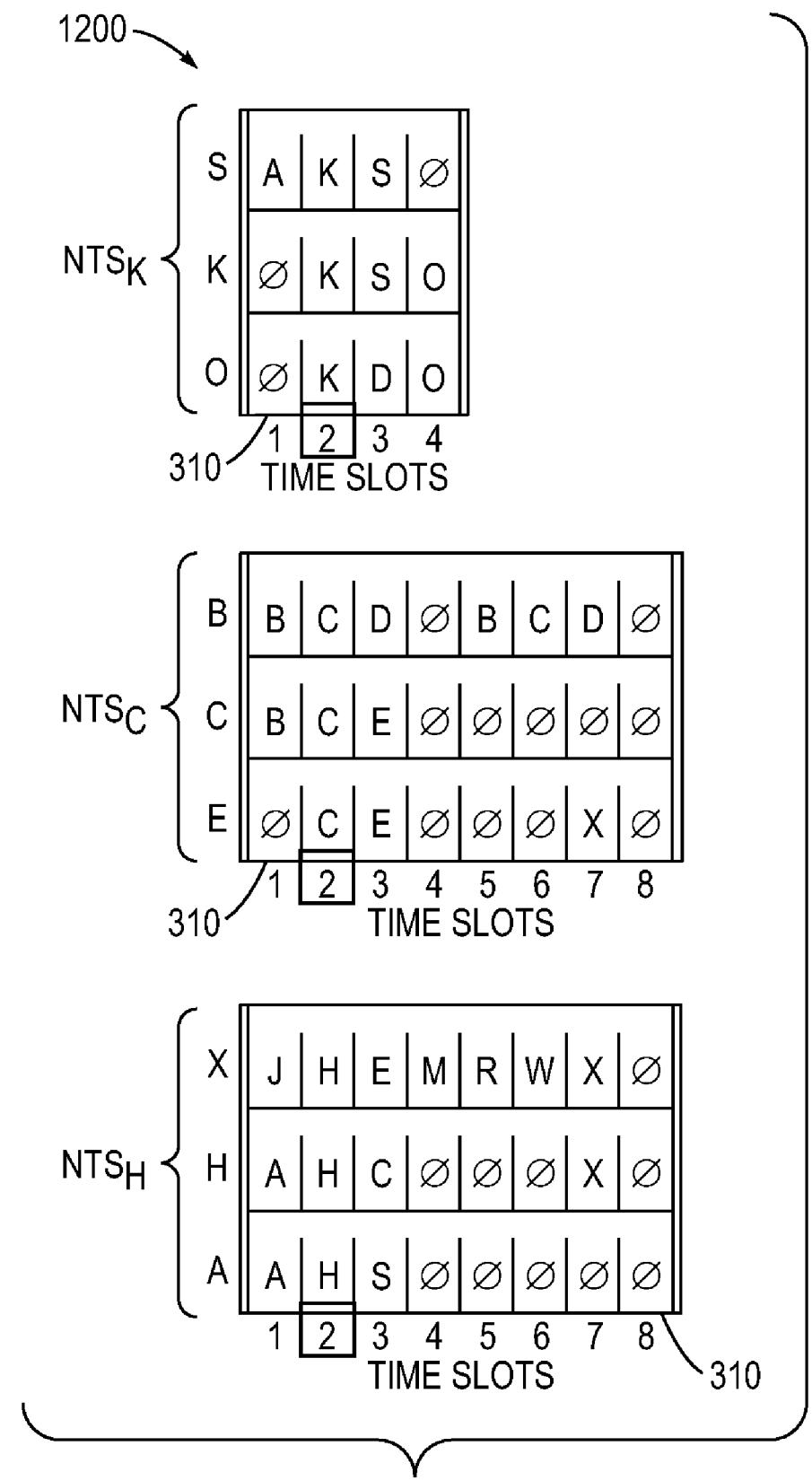
FIG. 12C is a block diagram illustrating neighborhood-transmission schedules computed by devices in a communication system in accordance with an embodiment of the present invention.
Figure 13A:
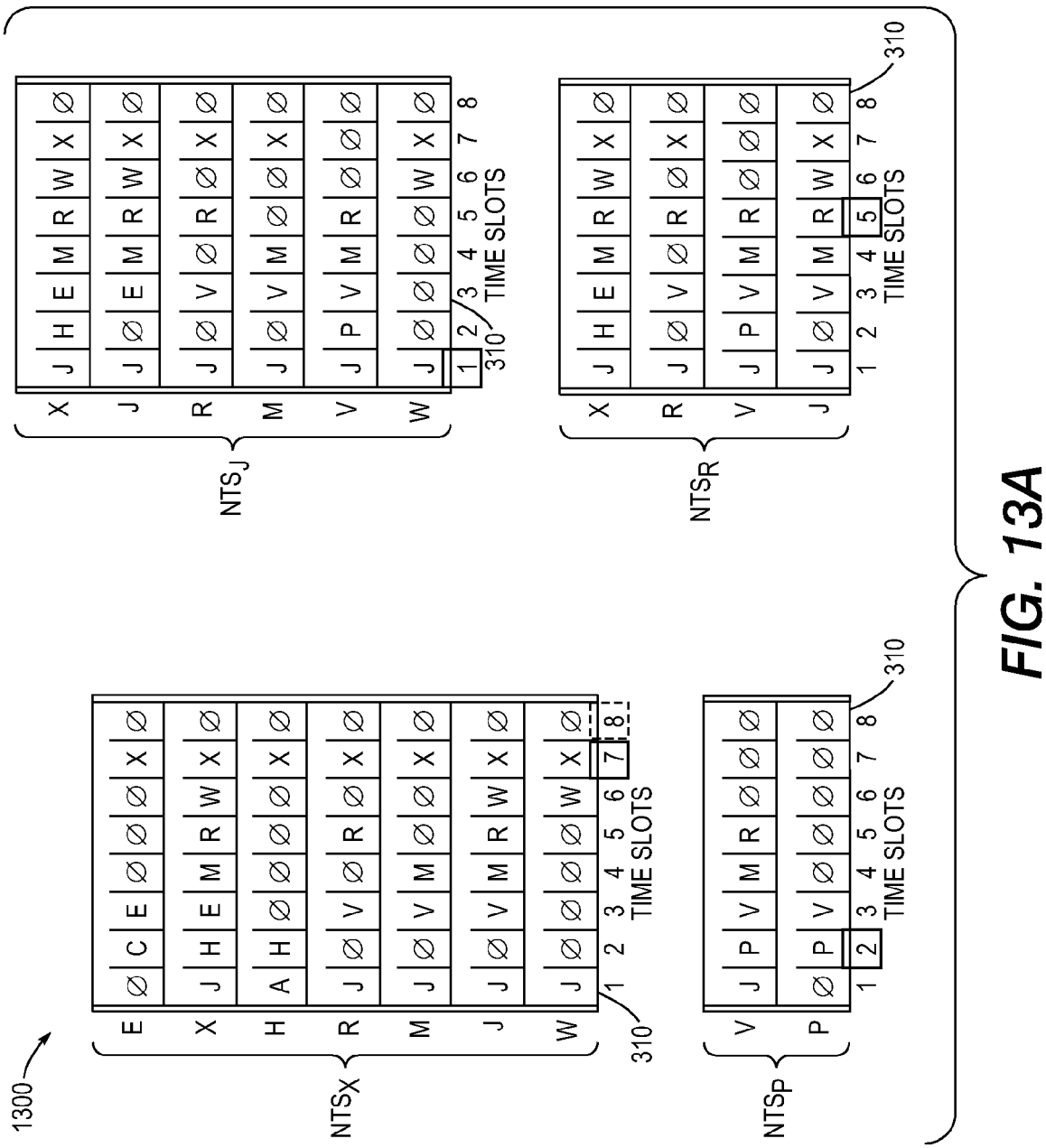
FIG. 13A is a block diagram illustrating neighborhood-transmission schedules computed by devices in a communication system in accordance with an embodiment of the present invention.
Figure 13B:
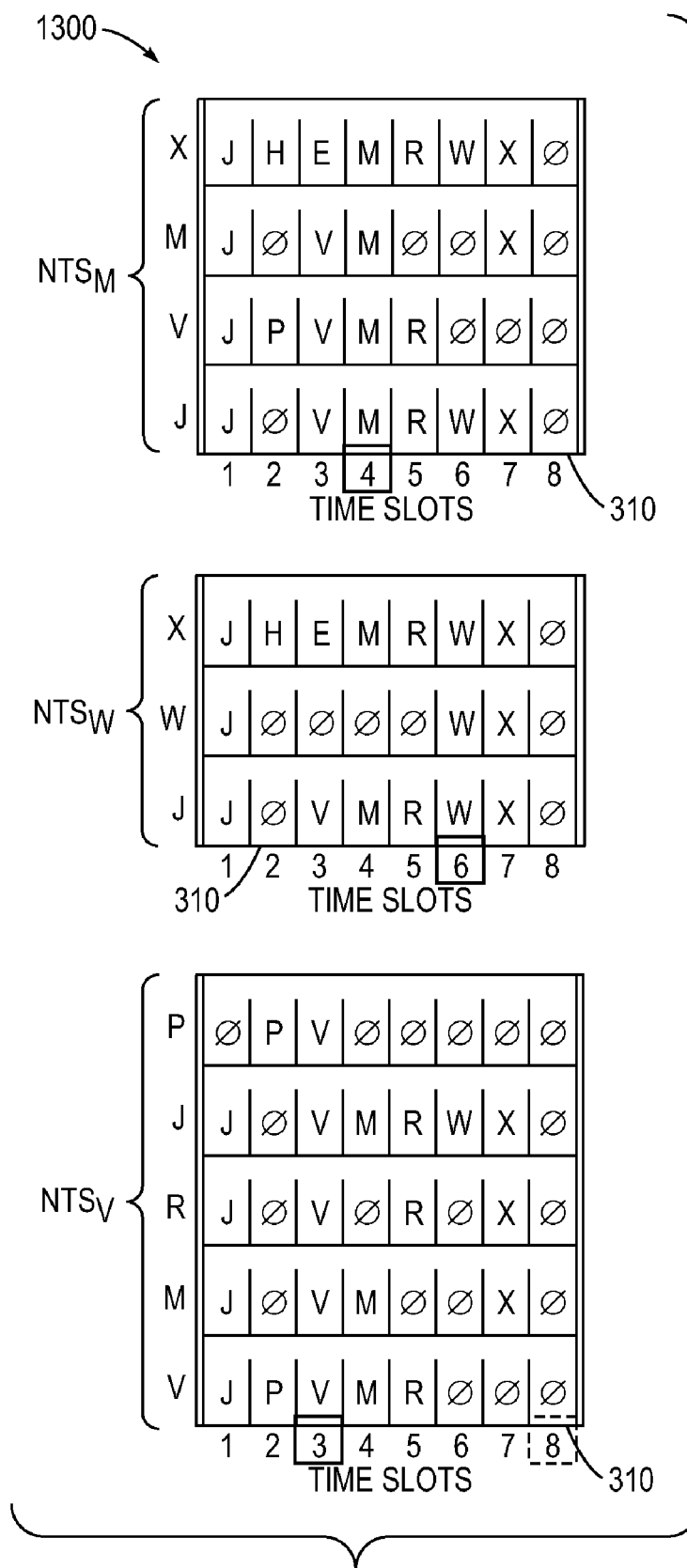
FIG. 13B is a block diagram illustrating neighborhood-transmission schedules computed by devices in a communication system in accordance with an embodiment of the present invention.

CBM(time-slot selection by priority)

count = number of empty slots in $NTS_K$;
device_set = Ø;
for t = 1 to $LCM_K$;
   Unanimous selection of device K;
      If $NTS_K[N, t]$ = K for all N in $OHN_K$, select time slot t;
   Partial selection of device K;
      If (Count > 0 and $NTS_K[N, t]$ = Ø for each N in $OHN_K$);
         Count = Count − 1;
         Pick P with largest identifier in $OHN_K$ − device_set;
         If P = K, select time slot t;
         Add P to device_set;
         If ($OHN_K$ = device_set), device_set = Ø;
end;

FIGS. 12-13C present block diagrams illustrating neighborhood-transmission schedule 1200 and neighborhood-transmission schedule 1300 computed by devices in the communication system 100 (FIG. 1) using CBMS in accordance with an embodiment of the present invention. Comparing these neighborhood-transmission schedules with neighborhood-transmission schedules 700 (FIG. 7), 800 (FIG. 8), and 900 (FIGS. 9A and 9B), it is clear that CBMS provides much shorter neighborhood-transmission schedules than LCMS at devices B, C, A, and S, while it increases the schedules of other devices only slightly. In neighborhood-transmission schedule 1300, devices V and X are able to select two time slots in their neighborhood-transmission schedules because they are selected unanimously for one time slot (time slot 7 for device X and time slot 3 for device V) and they are have the largest device identifier in their one-hop neighborhood for the second time slot (time slot 8 for devices V and X).

As in the case of LCMS, devices within two hops of one another must agree on the time slot where their own neighborhood-transmission schedules started. In some embodiments of NOMAD with CBMS, device K selects a schedule anchor to determine the position of the current time slot relative to the neighborhood-transmission schedule it computes. This schedule anchor may be the device in device K's one-hop neighborhood with the reported-transmission list that has the largest rank and the largest device identifier if there are ties in the largest rank of reported-transmission lists.

In some embodiments, on-demand elections may be used with CBMS. In this case, if device K wants to use a time slot for which all devices in its one-hop neighborhood have indicated an empty device-identifier value in its neighborhood-transmission schedule, device K transmits a reported-transmission list with the requested time-slot position specifying its own identifier. Furthermore, device K is free to use the requested time slot when it receives reported-transmission lists from its neighbors that lead to a unanimous assignment of the requested time slot to device K.

In some embodiments, devices with inconsistent information are enabled to hear their neighbors. For example, due to device mobility and other effects, devices may have inconsistent copies of reported-transmission lists from devices in their one-hop neighborhoods. A device may detect inconsistencies in its neighborhood-transmission schedule when it receives a neighborhood update from a one-hop neighborhood with a reported-transmission list that differs from the reported-transmission list it has stored for the same neighbor. Then, device K assumes the relative position of the current time slot follows the reference set by its schedule anchor. Given that all devices use lexicographic ordering of device identifiers and communicate the identifiers of devices in their one-hop neighborhoods, the LCMS and/or CBMS technique may suffice to distribute correct two-hop neighborhood information. However, if each device transmits in each time slot it is assigned in its neighborhood-transmission schedule, it is possible for two or more devices to be one-hop neighbors of one another and, because of inconsistent one-hop neighborhood information, to be unable to detect conflicts in time-slot assignments.

Figure 14:
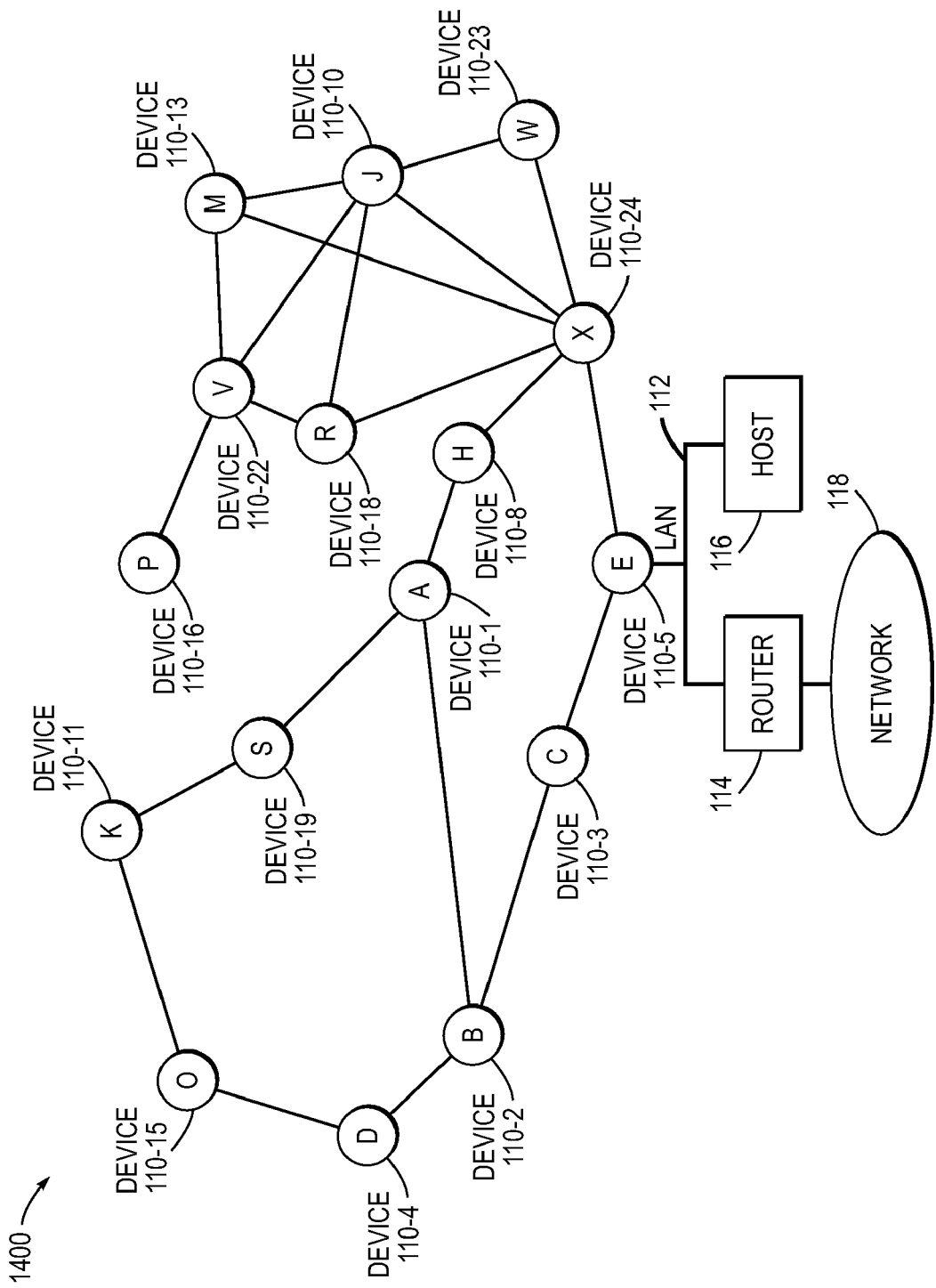
FIG. 14 is a block diagram illustrating a communication system in accordance with an embodiment of the present invention.

FIG. 14 presents a block diagram illustrating a communication system 1400 that uses CBMS in accordance with an embodiment of the present invention. In this example, devices A and B move such that they are in transmission range of each other after they have computed their neighborhood-transmission schedules without having each other in their one-hop neighborhoods. As can be observed from neighborhood-transmission schedule 1200 (FIG. 12), based on the information available to devices A and B when they were not each other's neighbors, they both select the first time slot in a neighborhood-transmission schedule of eight time slots. Furthermore, note that these devices do not have a common one-hop neighbor that can inform them of each other's presence in the neighborhood. As a consequence, transmissions from device A will interfere with transmissions to device B, and vice versa. From this example, it is clear that a set of operations are needed in some embodiments of NOMAD to avoid the case in which device K and some of its one-hop neighbors transmit persistently during the same time slot without being able to hear one another.

Therefore, in some embodiments, for a given choice of scheduling technique (LCMS or CBMS), device K selects a subset of the time slots it selects for itself and remains silent during those time slots. This operation allows device K to receive reported-transmission lists from one-hop neighbors that have made time-slot selections that conflict with the neighborhood-transmission schedule of device K. If neighborhood update messages are received during the time slots selected by device K for silent listening, device K updates $RTL_K$ as described previously.

In other embodiments, the transmission list assumed by each device has the first few time slots of the schedule dedicated to random access for devices to transmit reported-transmission lists. Furthermore, in other embodiments, the device identifier of each device is used to reduce the likelihood that any two one-hop neighbors select the same time slots for transmission for extended periods of time. In this example, a device identifier includes the concatenation of several symbols, one of them being an identifier that uniquely identifies the device in the network, and another one being a sequence number that the device picks at random (or pseudo-randomly) to change its device identifier. This approach changes the position of the time slot assigned to the device in its neighborhood-transmission schedule.

In some embodiments, multiple time slots per device are included in the neighborhood-transmission schedule. For example, depending on the application of NOMAD, a device may require more than one time slot for each cycle of its neighborhood-transmission schedule. To ensure that device K is assigned the number of time slots it requires, the NIDs used for the creation of neighborhood-transmission schedules may include a sequence number to differentiate each of the required time-slot positions by a given device.

In some embodiments, transmission ranges longer than one-hop are supported. For example, in some ad-hoc networks the effects of the physical layer are such that the transmissions from two-hop neighbors of a receiver may interfere with the transmissions from its one-hop neighbors. To address these cases, in some embodiments of NOMAD devices report the identifiers of one-hop and two-hop (or N-hop) neighbors in their reported-transmission lists, rather than the identifiers of one-hop neighbors as described above.

Figure 15:
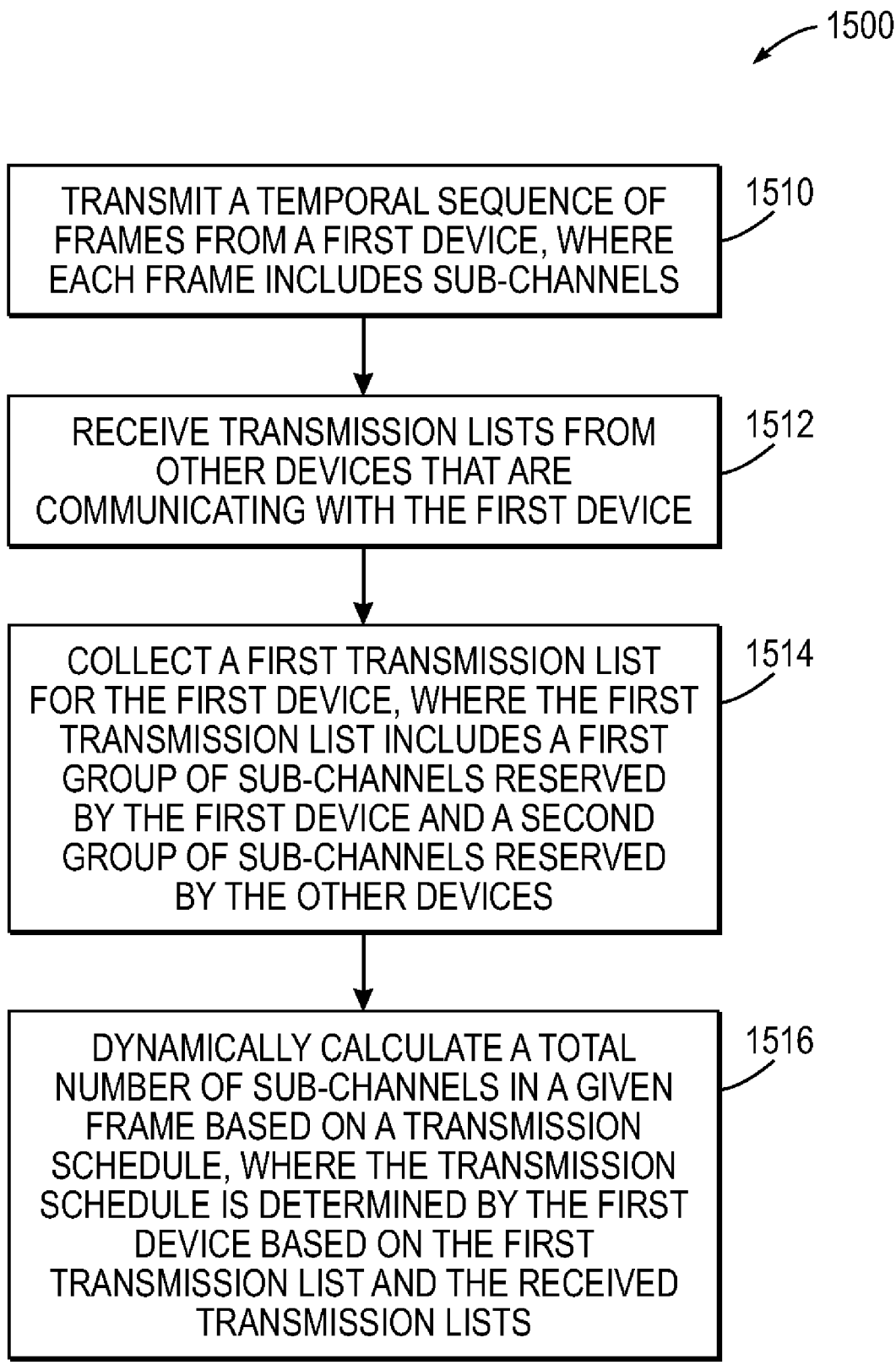
FIG. 15 is a flow chart illustrating the process of communication between devices in accordance with an embodiment of the present invention.

We now describe embodiments of a process of communication between devices. FIG. 15 provides a flow chart illustrating a process 1500 of communication between devices in accordance with an embodiment of the present invention. During this process, a first device transmits a temporal sequence of frames (1510) and receives transmission lists from other devices that are communicating with the first device (1512). Note that each frame includes multiple sub-channels. Next, the first device collects a first transmission list (1514). This first transmission list includes a first group of sub-channels reserved by the first device and a second group of sub-channels reserved by the other devices. Then, the first device dynamically calculates a total number of sub-channels in a given frame based on a transmission schedule (1516). This transmission schedule is determined by the first device based on the first transmission list and the received transmission lists. Note that in some embodiments there may be additional or fewer operations, the order of the operations may be changed, and two or more operations may be combined into a single operation.

Figure 16:
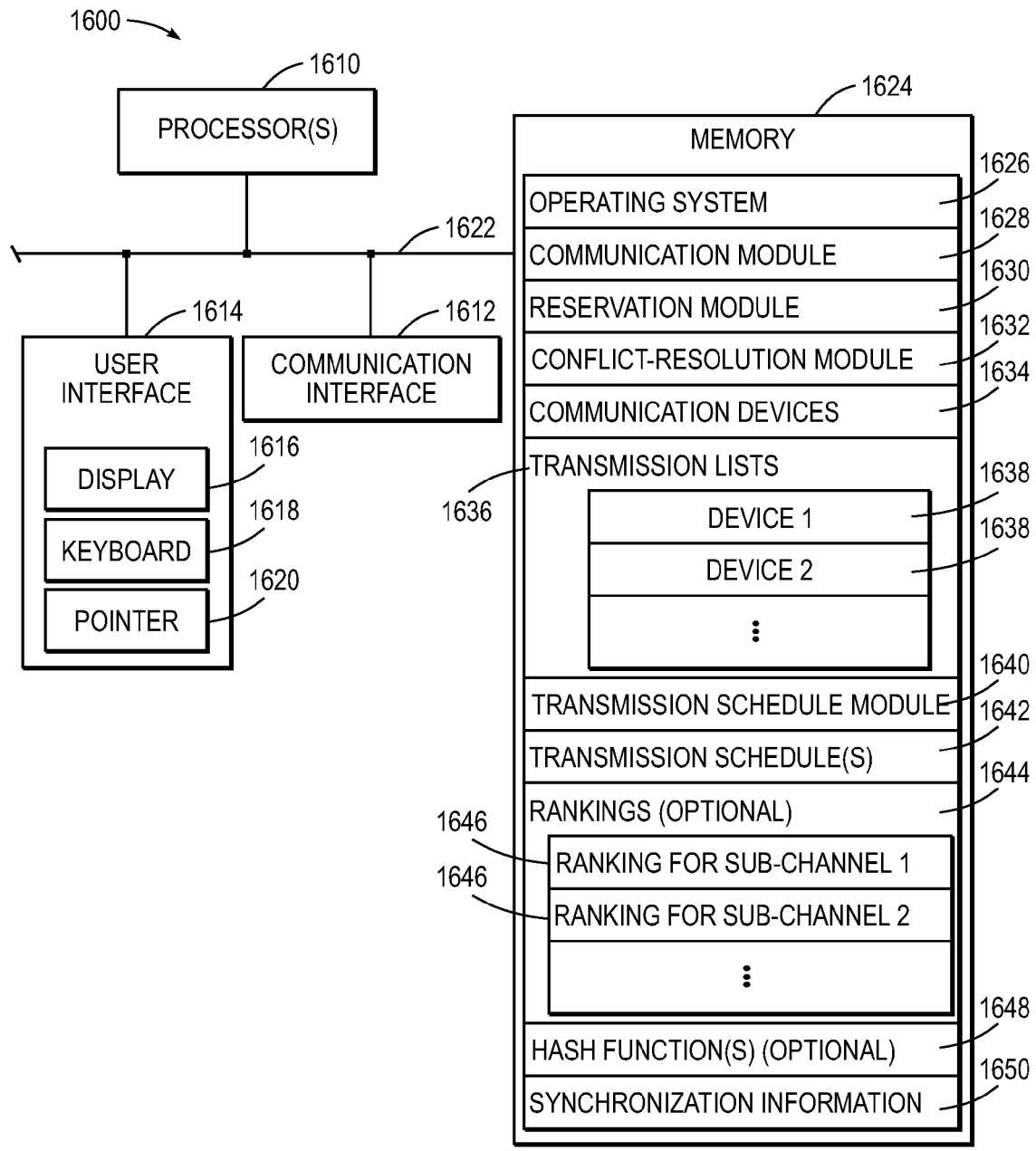
FIG. 16 is a block diagram illustrating a device in accordance with an embodiment of the present invention.

We now described devices for use in the communication system. FIG. 16 is a block diagram illustrating a device 1600 in accordance with an embodiment of the present invention. Device 1600 includes one or more processors 1610, a communication interface 1612, a user interface 1614, and one or more signal lines 1622 coupling these components together. Note that the one or more processing units 1610 may support parallel processing and/or multi-threaded operation, the communication interface 1612 may have a persistent communication connection, and the one or more signal lines 1622 may constitute a communication bus. Moreover, the user interface 1614 may include a display 1616, a keyboard 1618, and/or a pointer 1620, such as a mouse.

Memory 1624 in the device 1600 may include volatile memory and/or non-volatile memory. More specifically, memory 1624 may include ROM, RAM, EPROM, EEPROM, FLASH, one or more smart cards, one or more magnetic disc storage devices, and/or one or more optical storage devices. Memory 1624 may store an operating system 1626 that includes procedures (or a set of instructions) for handling various basic system services for performing hardware dependent tasks. In some embodiments, the operating system 1626 is a real-time operating system. The memory 1624 may also store procedures (or a set of instructions) in a communication module 1628. The communication procedures may be used for communicating with one or more computers, devices and/or servers, including computers, devices and/or servers that are remotely located with respect to the device 1600.

Memory 1624 may also include multiple program modules (or a set of instructions), including reservation module 1630 (or a set of instructions) and conflict-resolution module 1632 (or a set of instructions). Furthermore, memory 1624 may include a list of communication devices 1634 in the N-hop neighborhood of the device 1600, transmission lists 1636 for devices 1638, and/or one or more optional rankings 1644 (including rankings for different sub-channels 1646). The one or more rankings 1644 may be determined using a transmission-schedule module (or a set of instructions) 1640, which determines transmission schedules 1642. In addition, memory 1624 may include optional hash functions 1648 (which may be used to determine rankings 1644) and/or synchronization information 1650. This synchronization information may be used to determine when time slots begin and/or end.

Instructions in the various modules in memory 1624 may be implemented in a high-level procedural language, an object-oriented programming language, and/or in an assembly or machine language. The programming language may be compiled or interpreted, i.e, configurable or configured to be executed by the one or more processing units 1610.

Although device 1600 is illustrated as having a number of discrete items, FIG. 16 is intended to be a functional description of the various features that may be present in device 1600 rather than as a structural schematic of the embodiments described herein. In practice, and as recognized by those of ordinary skill in the art, the functions of the device 1600 may be distributed over a large number of servers or computers, with various groups of the servers or computers performing particular subsets of the functions. In some embodiments, some or all of the functionality of device 1600 may be implemented in one or more ASICs and/or one or more digital signal processors DSPs.

Device 1600 may include fewer components or additional components, two or more components may be combined into a single component, and/or a position of one or more components may be changed. In some embodiments the functionality of device 1600 may be implemented more in hardware and less in software, or less in hardware and more in software, as is known in the art.

Figure 17:
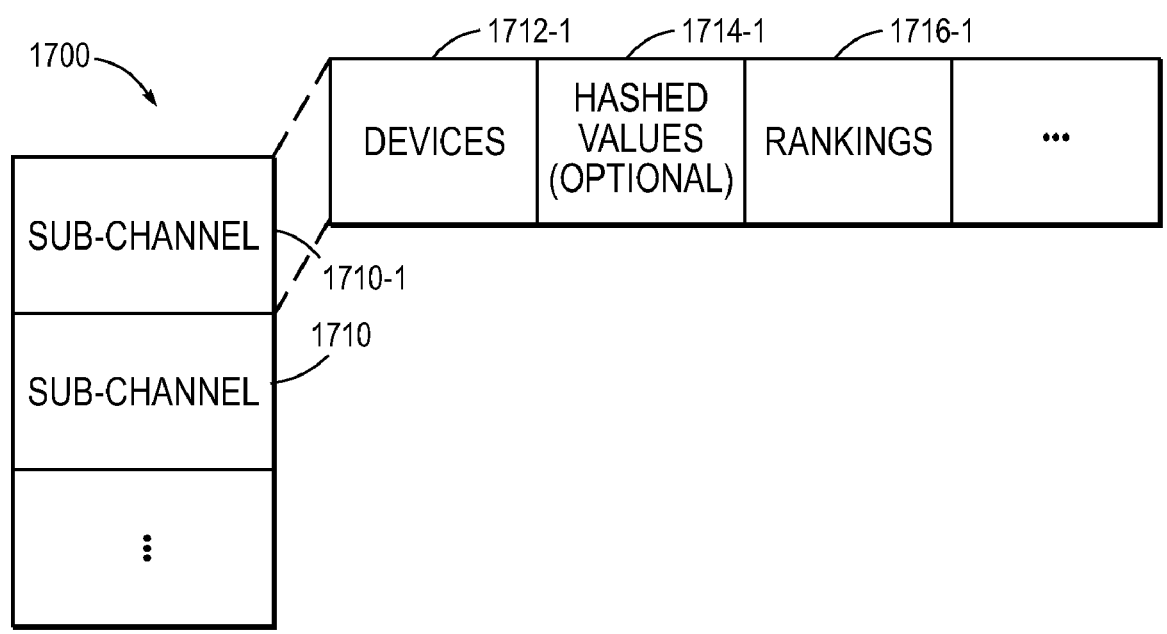
FIG. 17 is a block diagram illustrating a data structure in accordance with an embodiment of the present invention.

We now discuss data structures that may be used in device 1600. FIG. 17 is a block diagram illustrating a data structure 1700 in accordance with an embodiment of the present invention. This data structure may contain rankings for sub-channels 1710. Each sub-channel, such as sub-channel 1710-1, may include devices 1712-1, hashed values 1714-1, and rankings 1716-1. Note that that in some embodiments of the data structure 1700 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A communication system, comprising:
   devices configured to communicate with each other through a temporal sequence of frames,
   wherein each frame includes sub-channels;
   wherein a total number of sub-channels in a given frame is dynamically determined based on a transmission schedule;
   wherein the transmission schedule is calculated by the devices based on transmission lists that are exchanged between the devices;
   wherein a first transmission list for a first device includes a first group of sub-channels reserved by the first device and a second group of sub-channels reserved by a set of devices communicating with the first device; and
   wherein the total number of sub-channels is a least common multiple of the number of sub-channels in the transmission lists exchanged between the devices, and wherein the least common multiple is a product of ranks of the transmission lists divided by a largest common divisor of the ranks.

2. The communication system of claim 1, wherein the first device communicates with a first subset of the set of devices directly.

3. The communication system of claim 2, wherein the first device communicates with a second subset of the set of devices indirectly, and wherein indirect communication between the first device and a second device is mediated via a third device that communicates directly with the first device.

4. The communication system of claim 3, wherein the second group of sub-channels includes sub-channels reserved by the first subset of the set of devices and sub-channels reserved by the second subset of the set of devices.

5. The communication system of claim 1, wherein the first transmission list includes margin for future transmission needs of either or both of the first device and the set of devices.

6. The communication system of claim 5, wherein the margin includes un-reserved sub-channels for use in communicating between the devices.

7. The communication system of claim 1, wherein the first transmission list is transmitted by the first device during one or more sub-channels in the first group of sub-channels.

8. The communication system of claim 7, wherein the first transmission list is exchanged during control portions of the one or more of the sub-channels in the first group of sub-channels.

9. The communication system of claim 1, wherein the first transmission list includes identifiers for the first device and the set of devices corresponding to the first group of sub-channels and the second group of sub-channels.

10. The communication system of claim 9, wherein the first device is configured to determine an ordered-transmission list based on the exchanged transmission lists;
wherein the ordered-transmission list include a lexicographical ordering of the identifiers for the sub-channels in the first transmission list; and
wherein the first device is configured to dynamically select sub-channels to reserve based on a ranking of the first device for available sub-channels in the ordered-transmission list.

11. The communication system of claim 10, wherein the first device is configured to add a sub-channel to the first transmission list if the first device is unable to select a sub-channel to reserve.

12. The communication system of claim 1, wherein the first transmission list includes updates to either or both of the first group of sub-channels and the second group of sub-channels.

13. The communication system of claim 1, wherein the transmission schedule allows conflict-free communication between the devices using the sub-channels.

14. The communication system of claim 1, wherein a time delay between two sub-channels in the first group of sub-channels is less than a pre-determined value.

15. The communication system of claim 1, wherein a first rank for the first device is a smallest power of a common base number for the communication system which is larger than a number of sub-channels in the first group of sub-channels and the second group of sub-channels.

16. The communication system of claim 1, wherein the total number of sub-channels is a common multiple of the number of sub-channels in the transmission lists exchanged between the devices.

17. The communication system of claim 1, wherein the transmission schedule repeats the first transmission list for the first device N times thereby ensuring that transmissions from the first device have the same periodicity as the transmission schedule, and wherein N is an integer.

18. The communication system of claim 1, wherein the sub-channels correspond to time slots, frequency bands, spread-spectrum codes, or directional antennas that transmit and receive the frames.

19. A communication device, comprising:
a transceiver configured to communicate with other devices through a temporal sequence of frames,
wherein each frame includes sub-channels;
wherein a total number of sub-channels in a given frame is dynamically determined based on a transmission schedule;
wherein the transmission schedule is calculated by the communication device based on a first transmission list collected by the communication device and transmission lists that are exchanged with the other devices;
wherein the first transmission list includes a first group of sub-channels reserved by the communication device and a second group of sub-channels reserved by the other devices; and
wherein the total number of sub-channels is a least common multiple of the number of sub-channels in the transmission lists exchanged between the devices, and wherein the least common multiple is a product of ranks of the transmission lists divided by a largest common divisor of the ranks.

20. A method for communicating between devices, comprising:
transmitting a temporal sequence of frames from a first device, wherein each frame includes sub-channels;
receiving transmission lists from other devices that are communicating with the first device;
collecting a first transmission list for the first device, wherein the first transmission list includes a first group of sub-channels reserved by the first device and a second group of sub-channels reserved by the other devices; and
dynamically calculating a total number of sub-channels in a given frame based on a transmission schedule, wherein the transmission schedule is determined by the first device based on the first transmission list and the received transmission lists; and
wherein the total number of sub-channels is a least common multiple of the number of sub-channels in the transmission lists exchanged between the devices, and wherein the least common multiple is a product of ranks of the transmission lists divided by a largest common divisor of the ranks.

* * * * *